United States Patent [19]
Schuster

[11] Patent Number: 6,067,094
[45] Date of Patent: May 23, 2000

[54] BRUSHSTROKE ENVELOPES

[75] Inventor: Michael D. Schuster, Redwood City, Calif.

[73] Assignee: Adobe Systems Incorporated, San Jose, Calif.

[21] Appl. No.: 09/057,011

[22] Filed: Apr. 7, 1998

[51] Int. Cl.[7] .................................. G06T 11/20
[52] U.S. Cl. ................. 345/441; 345/150; 345/153; 345/442
[58] Field of Search ................... 345/441, 442, 345/150, 153

[56] References Cited

U.S. PATENT DOCUMENTS

| | | | |
|---|---|---|---|
| 5,325,477 | 6/1994 | Klassen | 345/442 |
| 5,798,769 | 8/1998 | Chiu et al. | 345/442 |
| 5,844,565 | 12/1998 | Mizutani et al. | 345/429 |
| 5,900,884 | 5/1999 | Minami et al. | 345/442 |
| 5,999,190 | 12/1999 | Sheasby et al. | 345/431 |

OTHER PUBLICATIONS

Fabris et al., "Stroking Discrete Polynomial Bezier Curves via Point Containment Paradigm", IEEE, pps. 94–100, 1998.

*Primary Examiner*—Mark R. Powell
*Assistant Examiner*—Motilewa Good-Johnson
*Attorney, Agent, or Firm*—Fish & Richardson P.C.

[57] ABSTRACT

An envelope enclosing brush instances corresponding to transformations of a brush at points along a trajectory is generated. Points on the brush instances that are furthest from the trajectory are identified, and the identified points are connected based on the trajectory and the relative orientations of the brush instances.

36 Claims, 21 Drawing Sheets

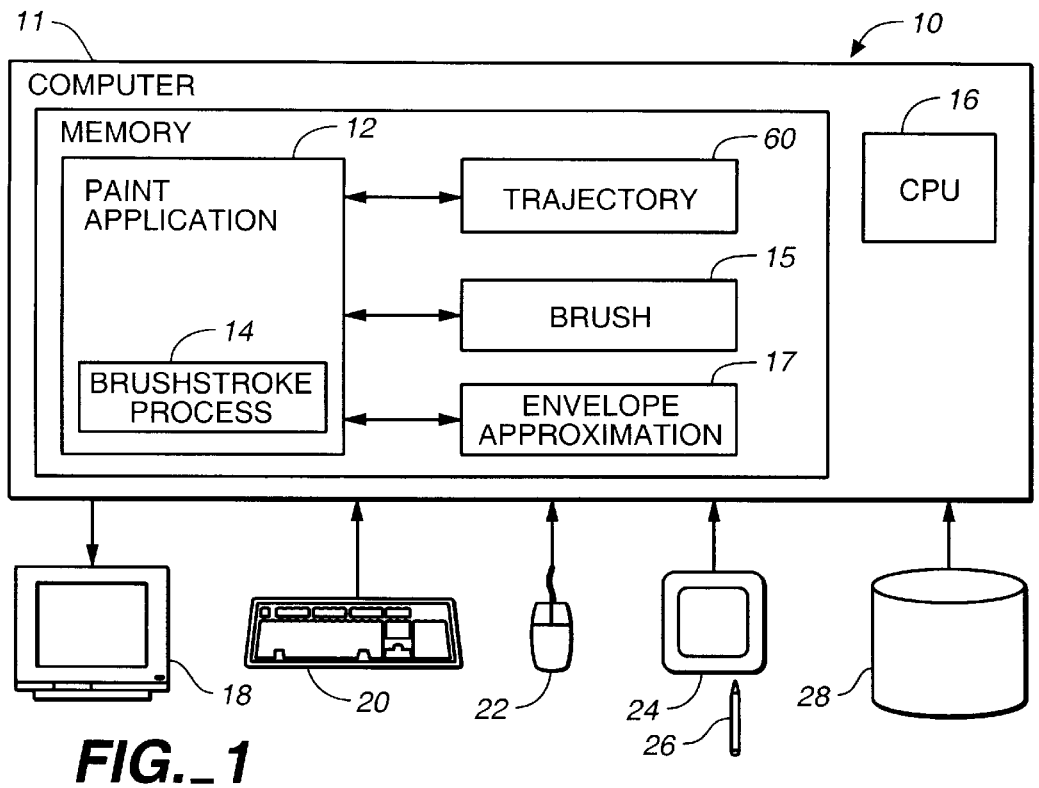
FIG._1
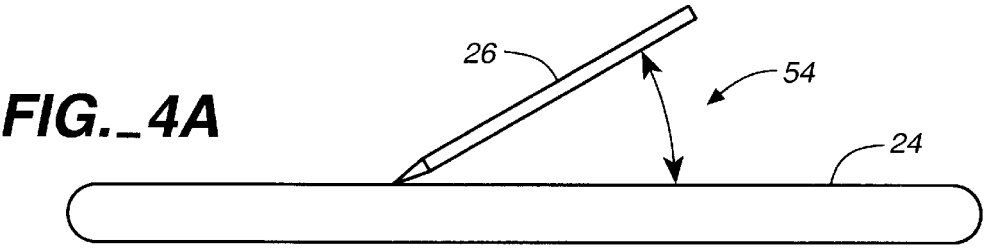
FIG._4A
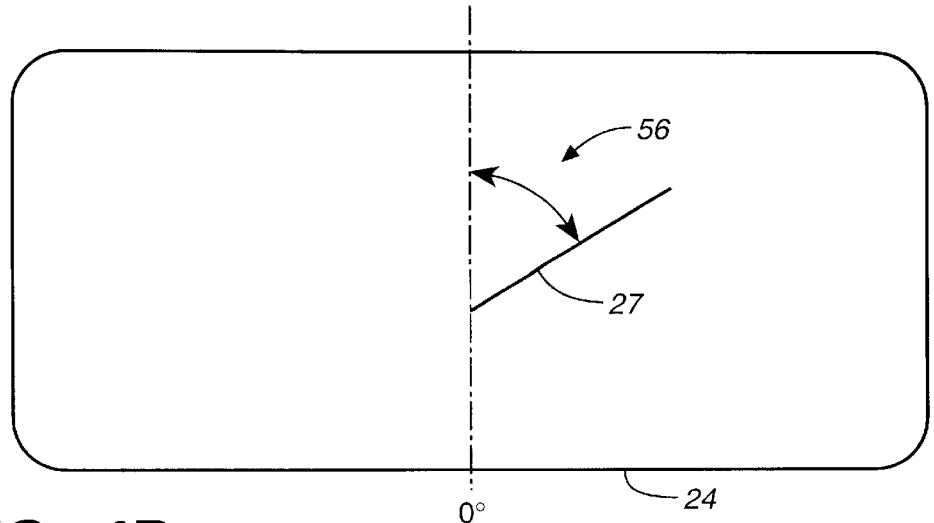
FIG._4B

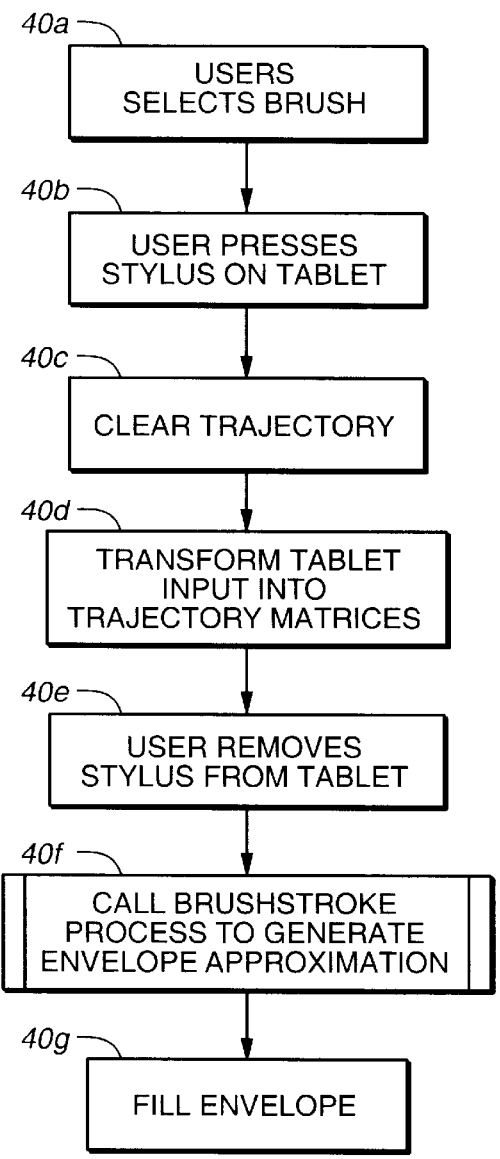
FIG._2
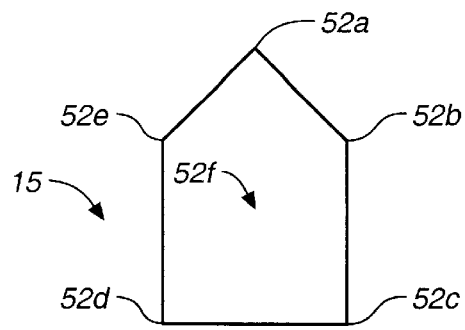
FIG._3
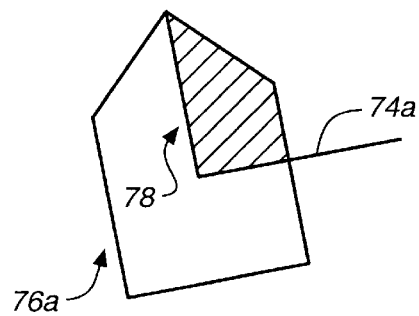
FIG._8
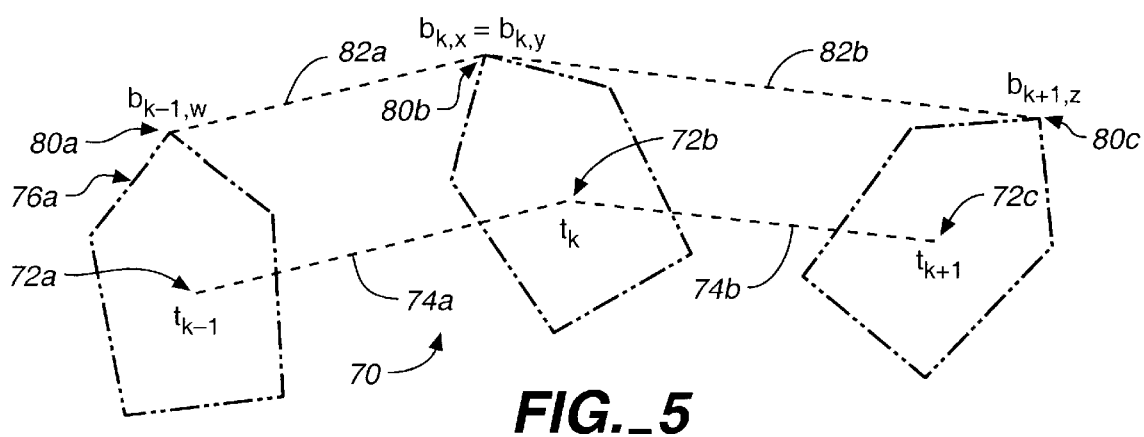
FIG._5

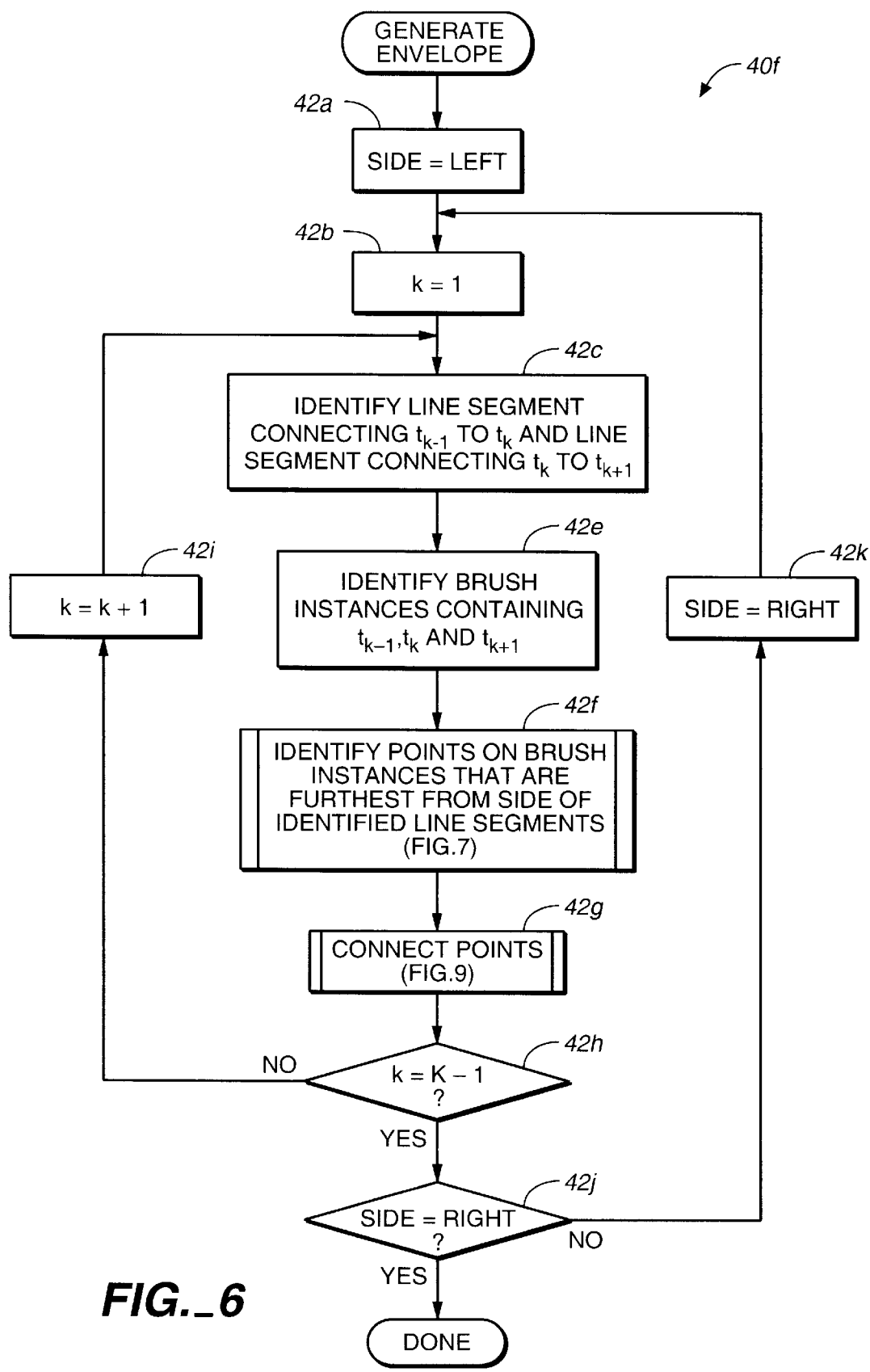
FIG._6

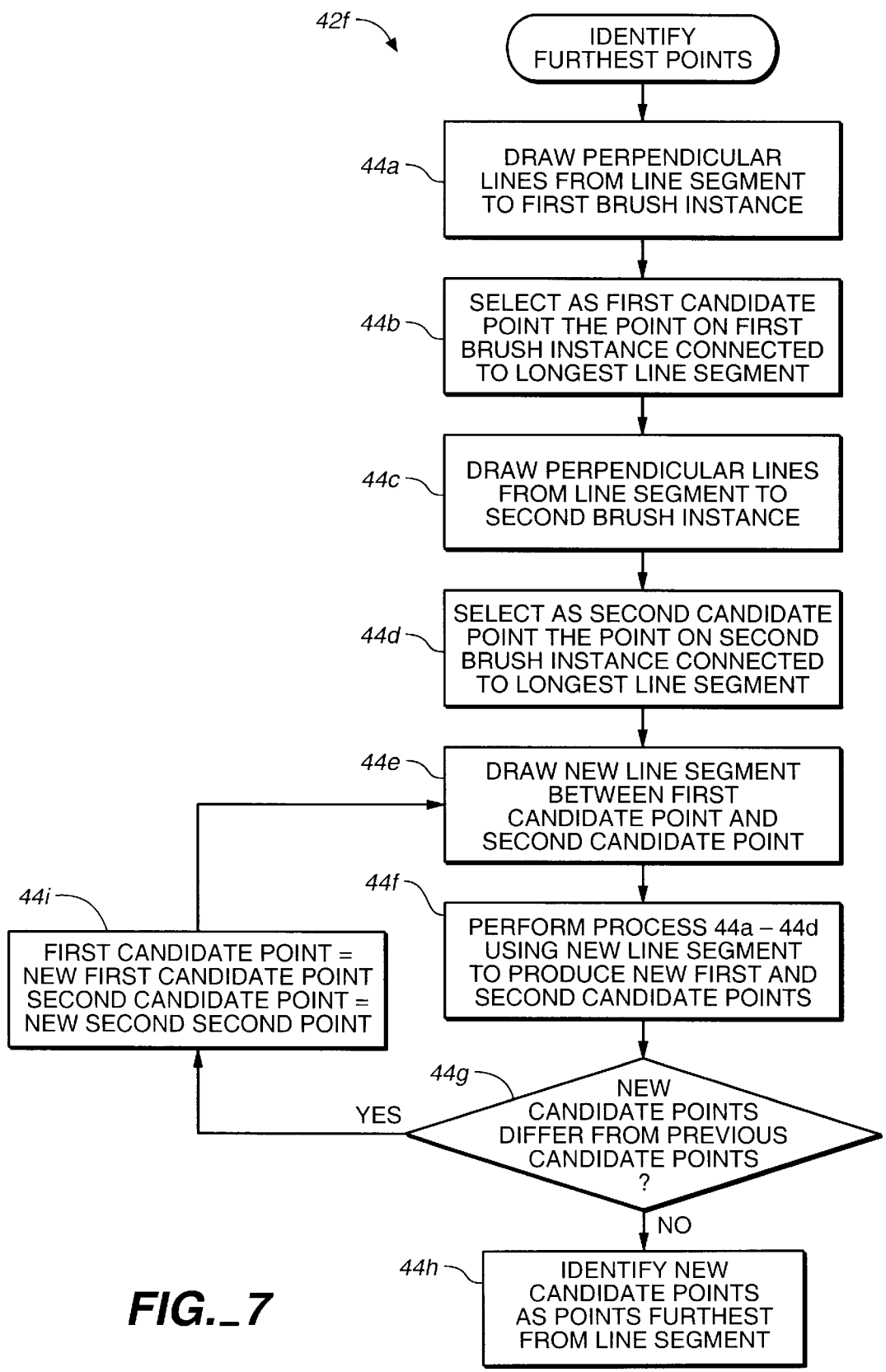
FIG._7

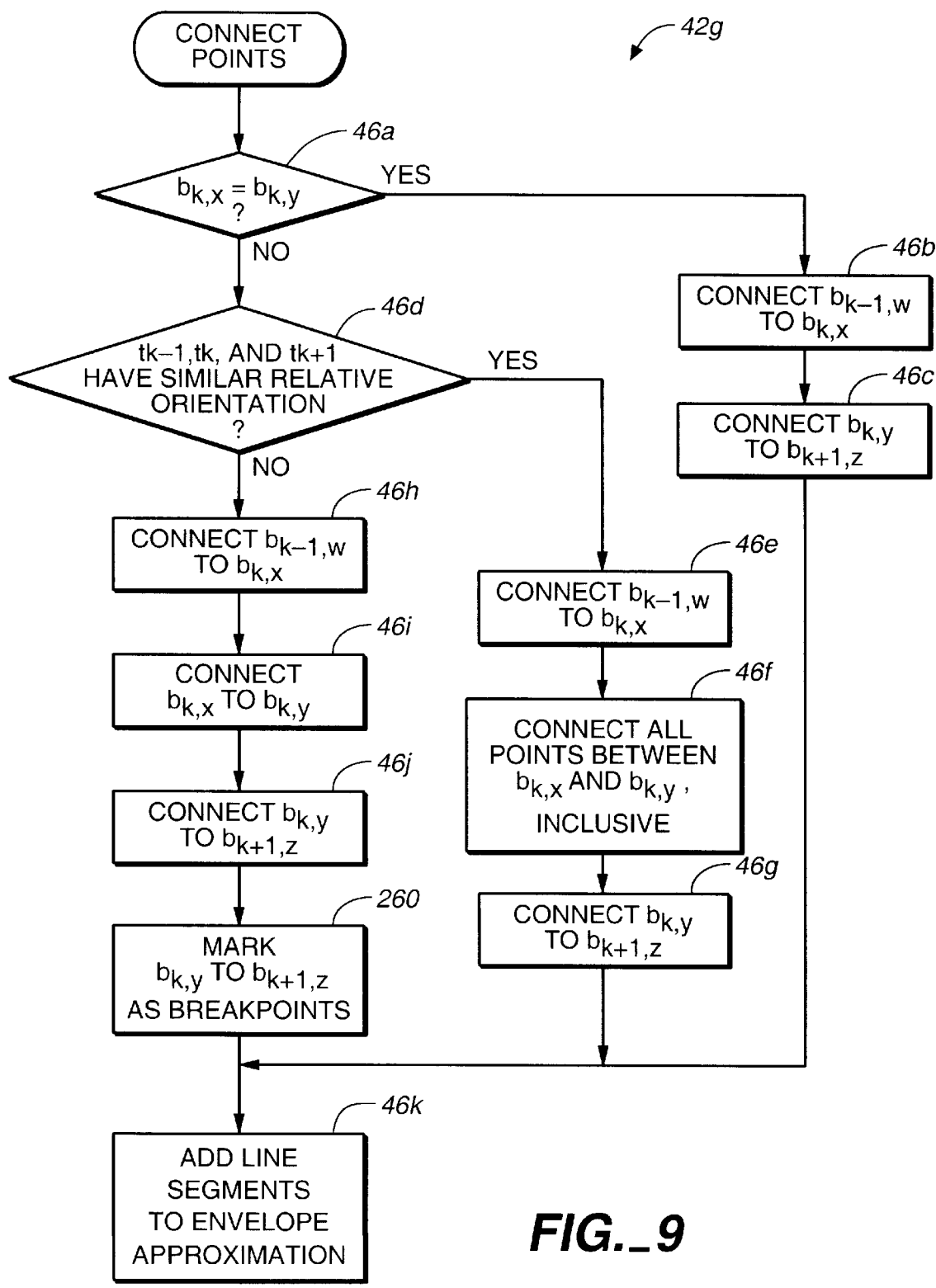
FIG._9

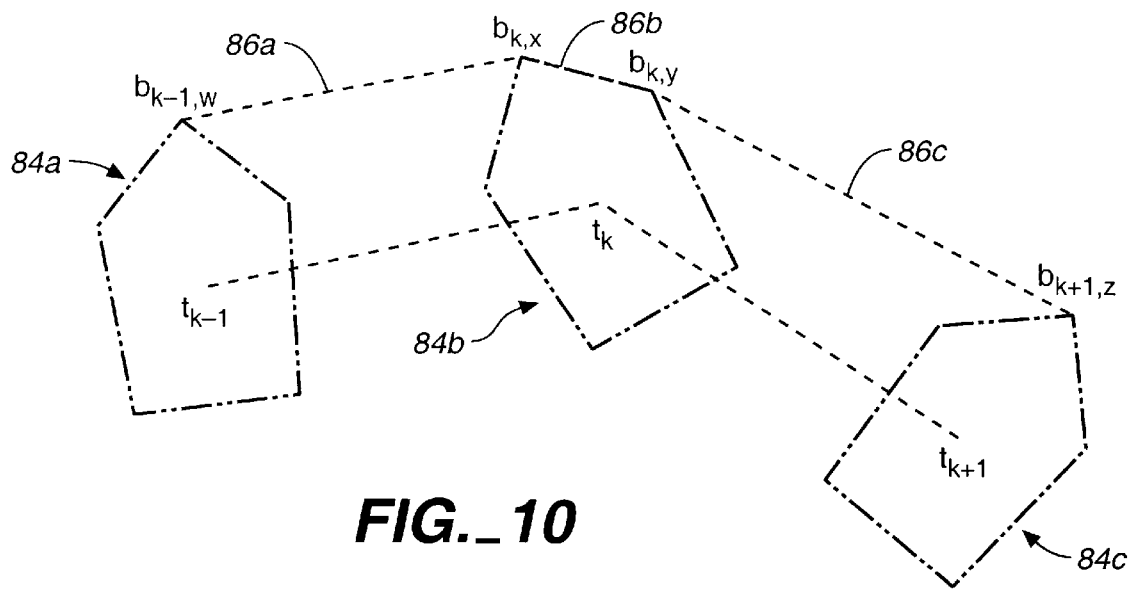
FIG._10
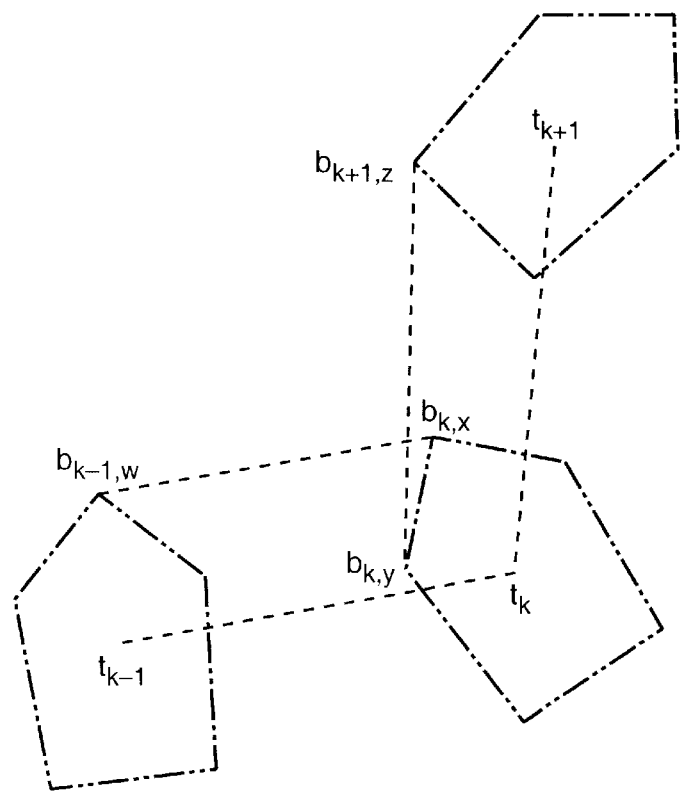
FIG._11

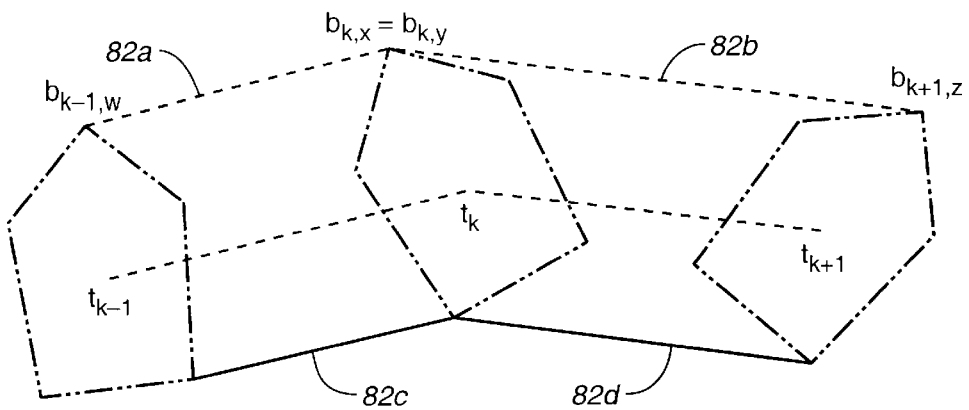
FIG._12
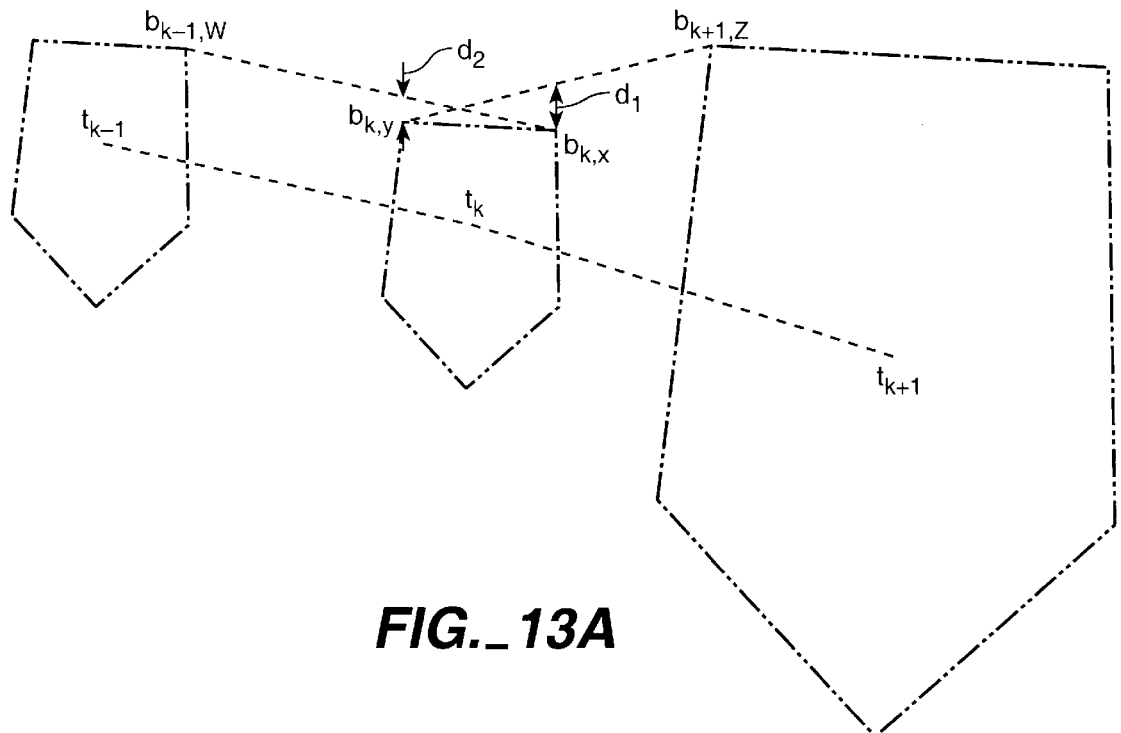
FIG._13A

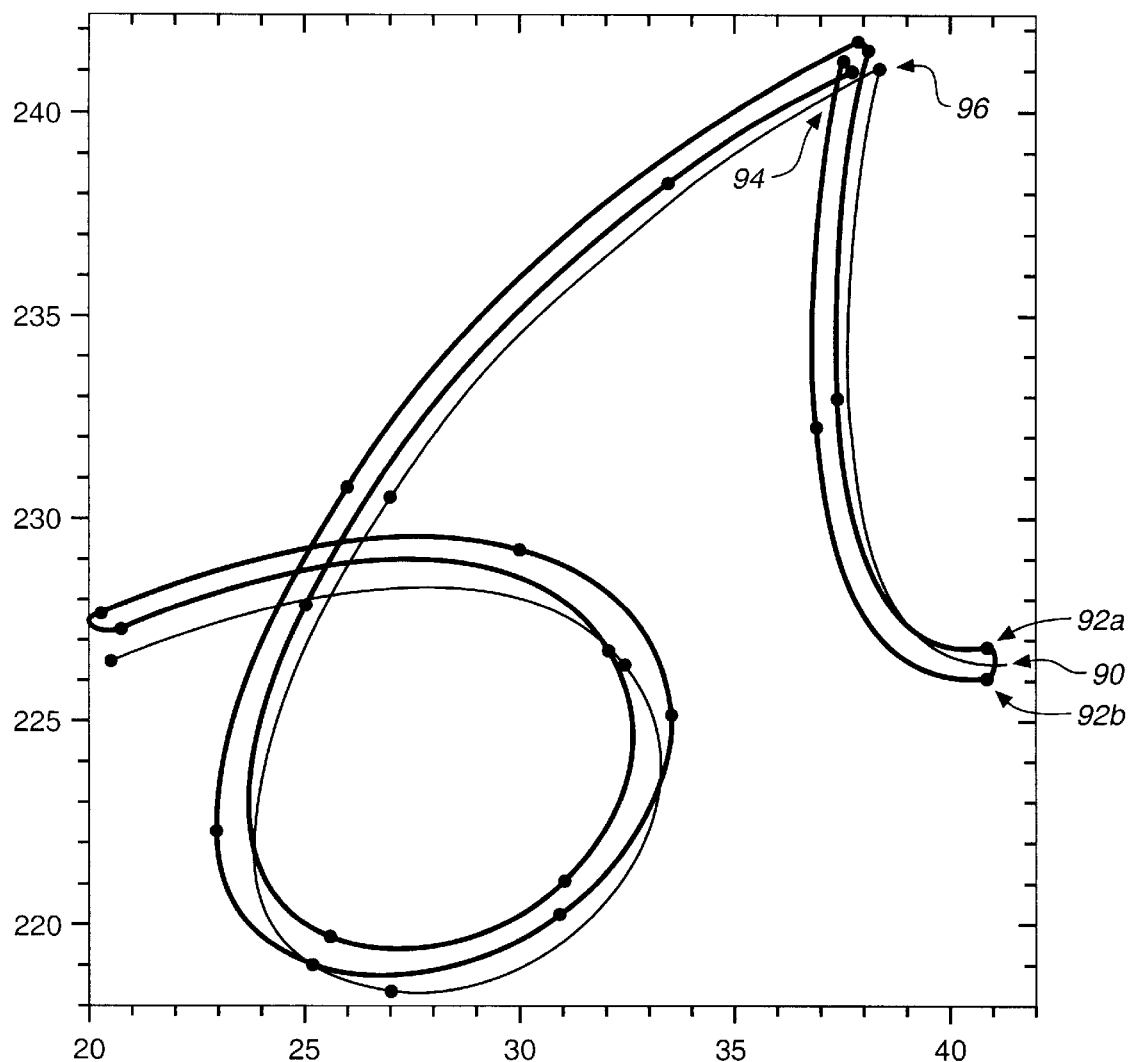
FIG._13B

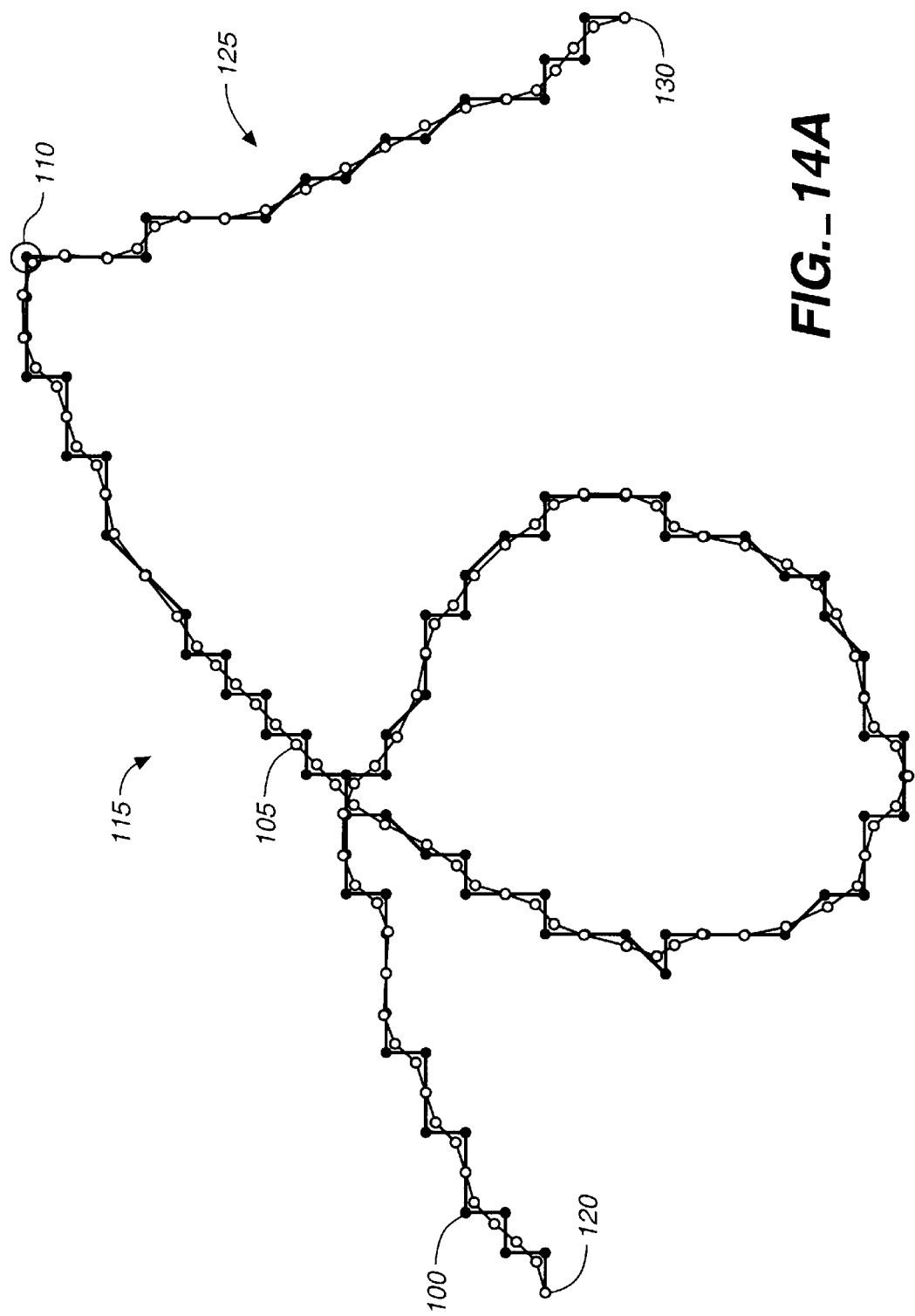
FIG._14A

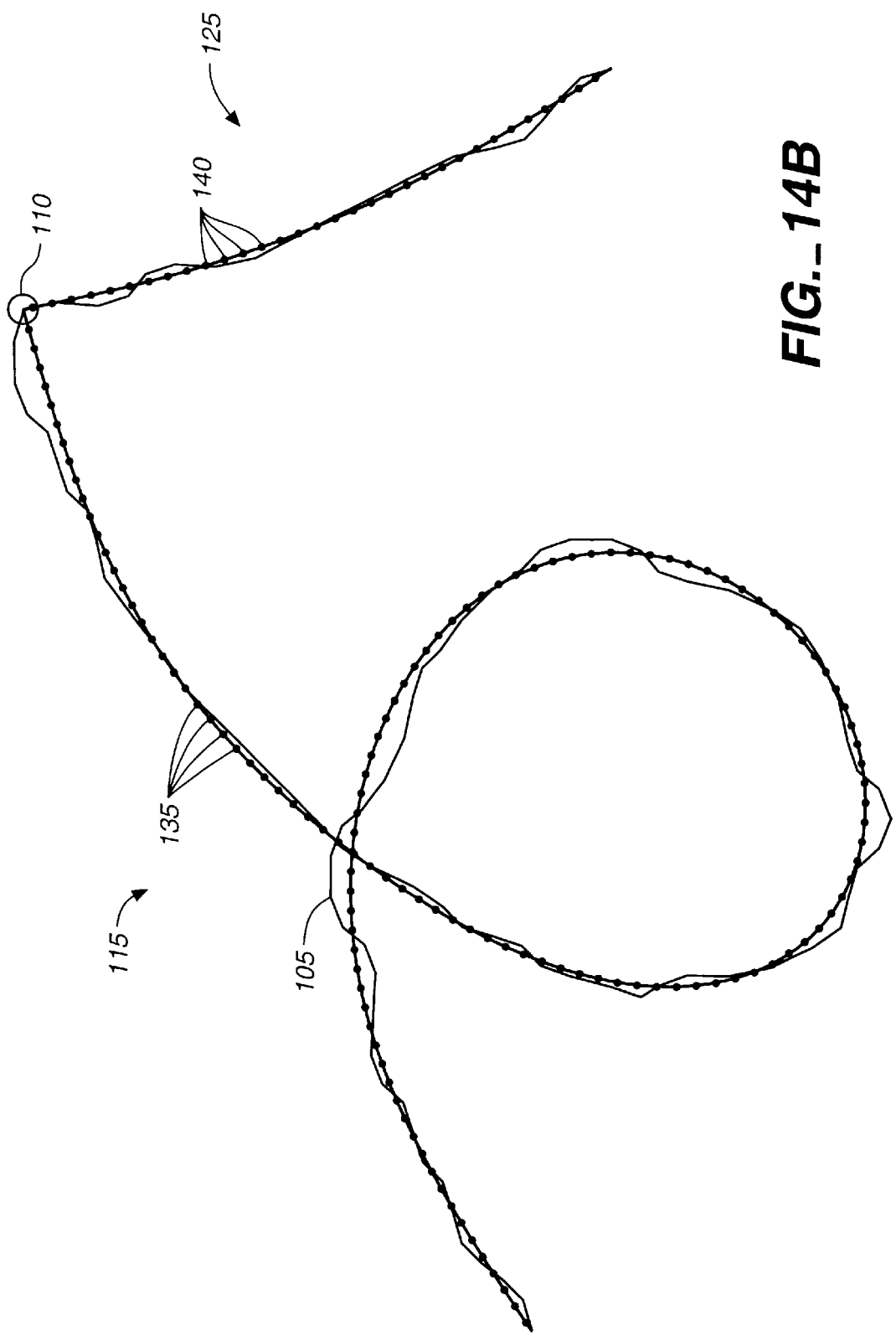
FIG._14B

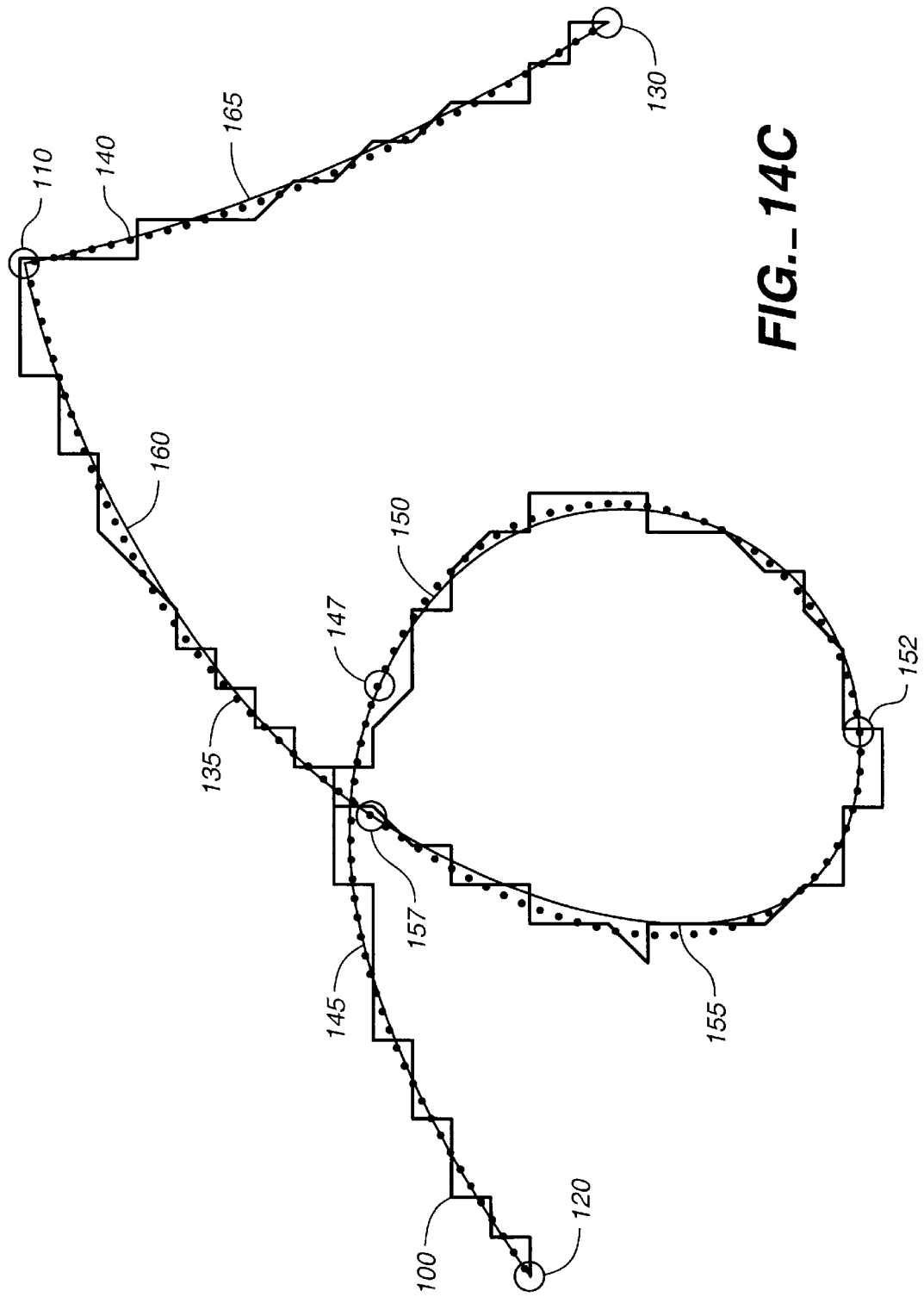
FIG._14C

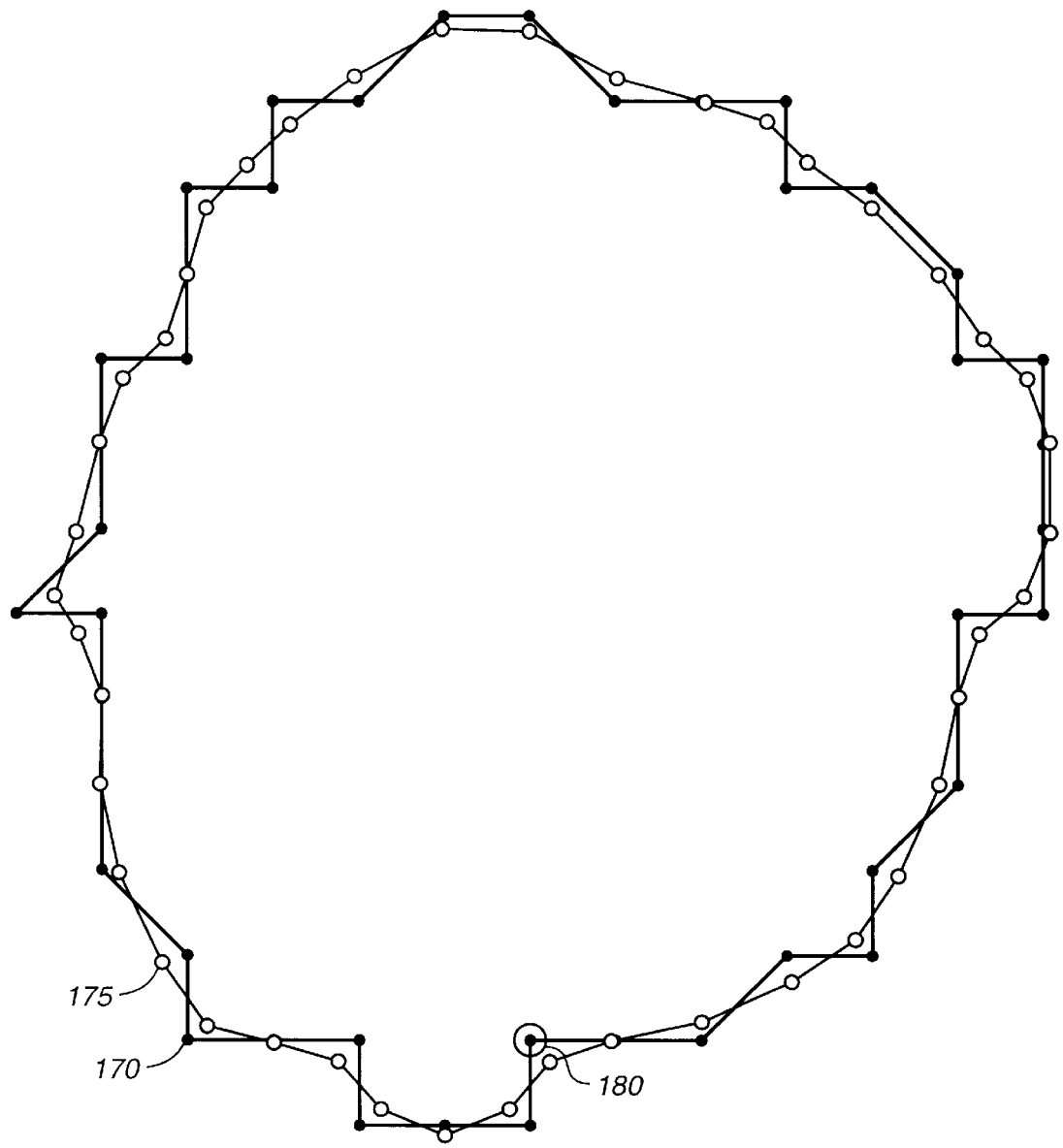
FIG._14D

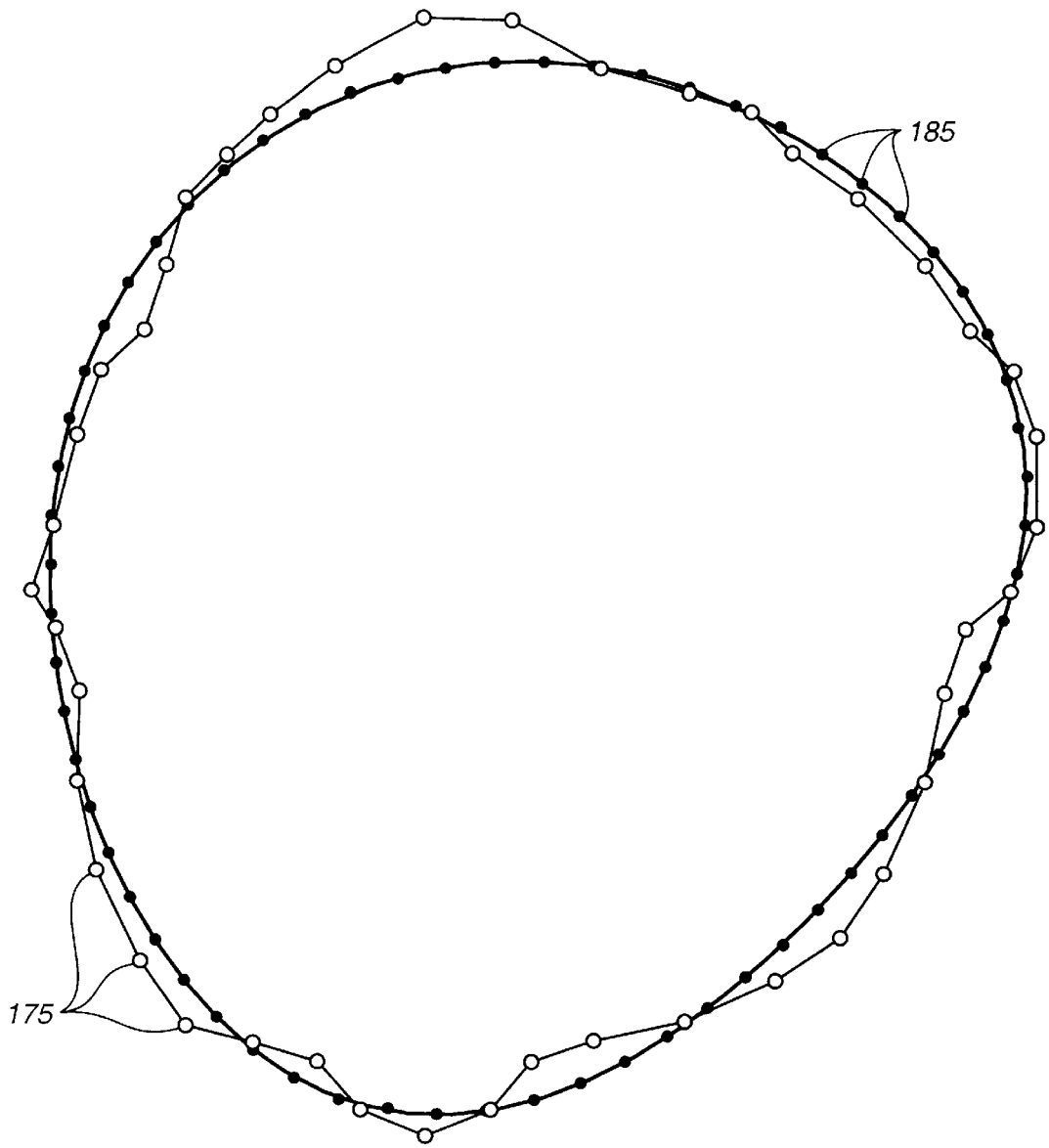
FIG._14E

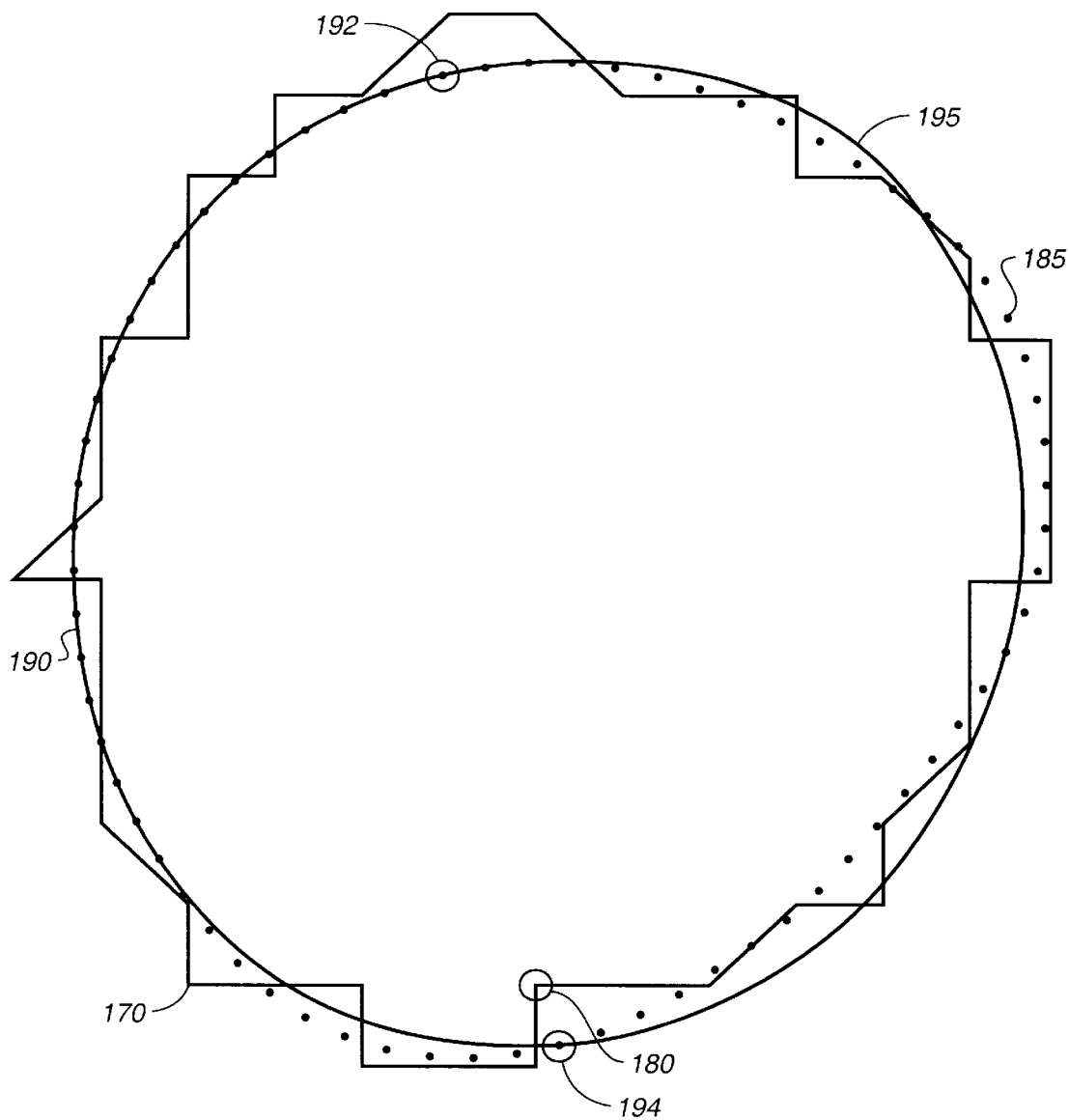
FIG._14F

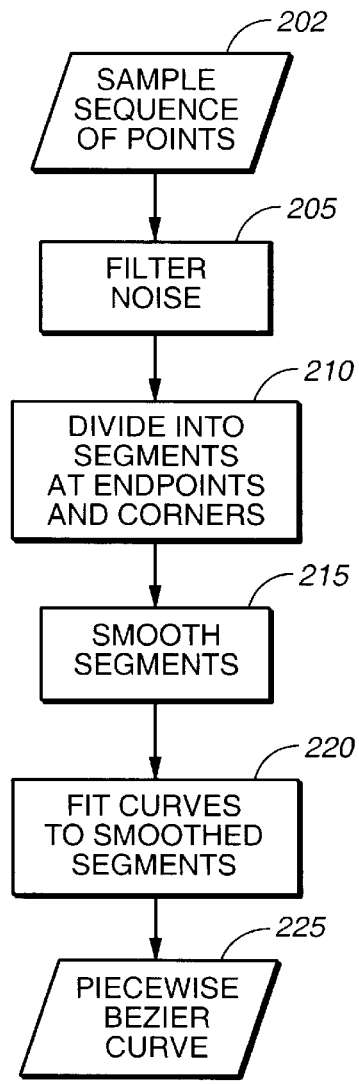
FIG._15
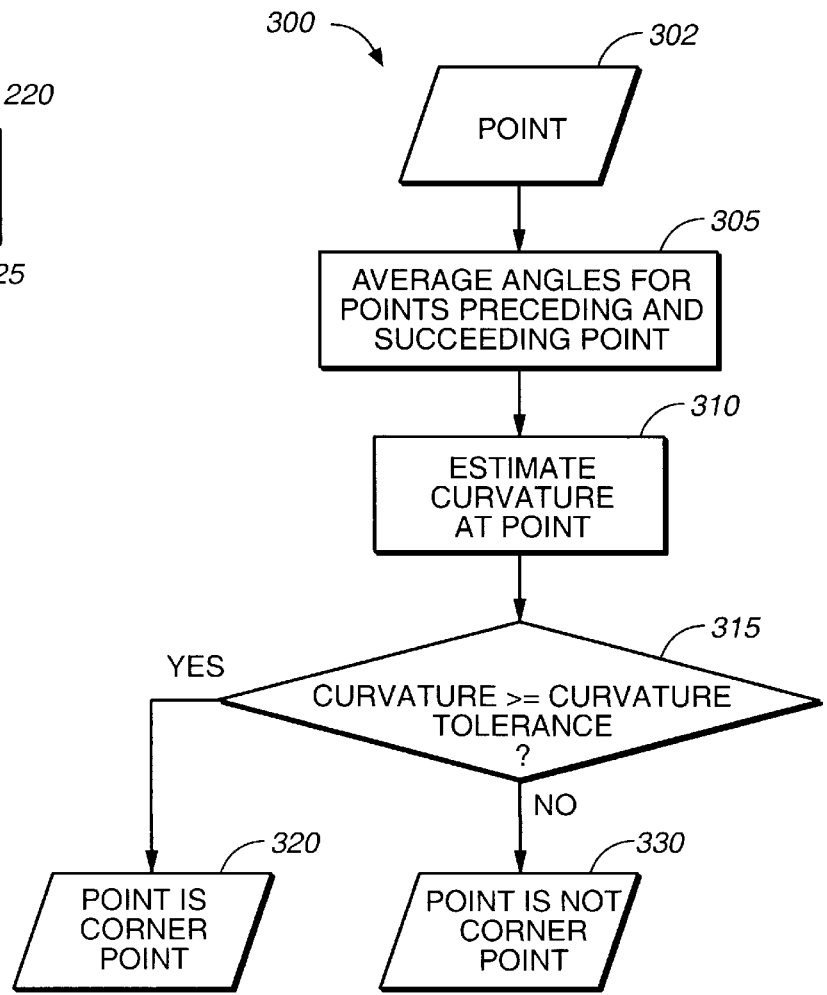
FIG._16

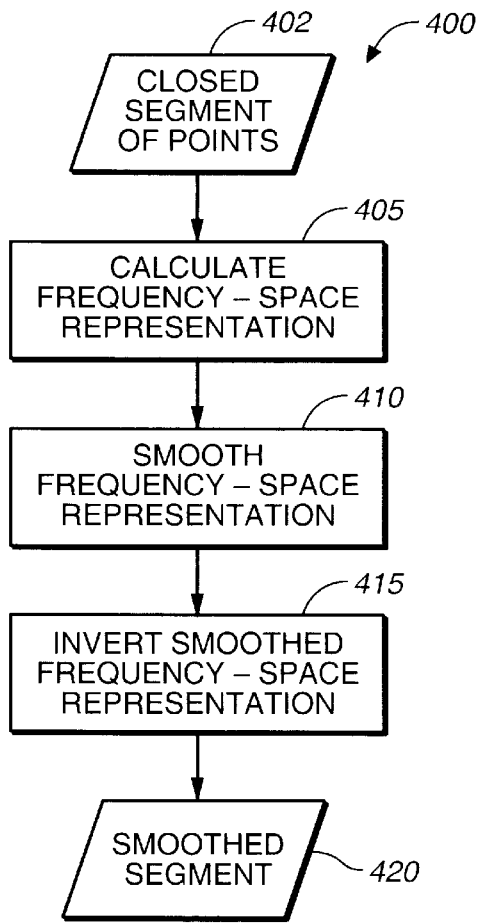
FIG._17A
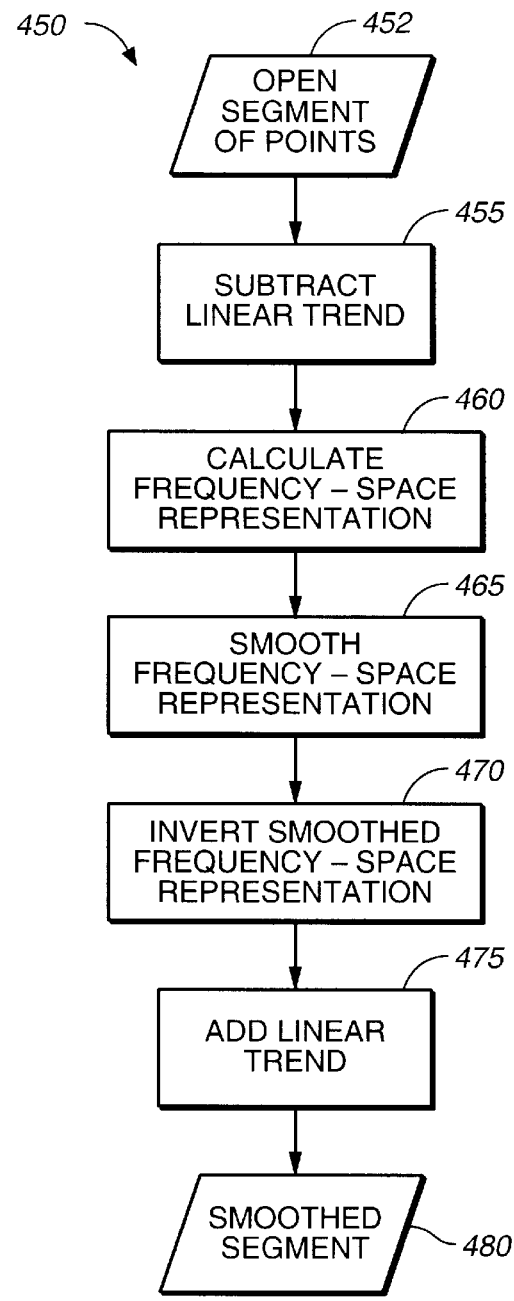
FIG._17B

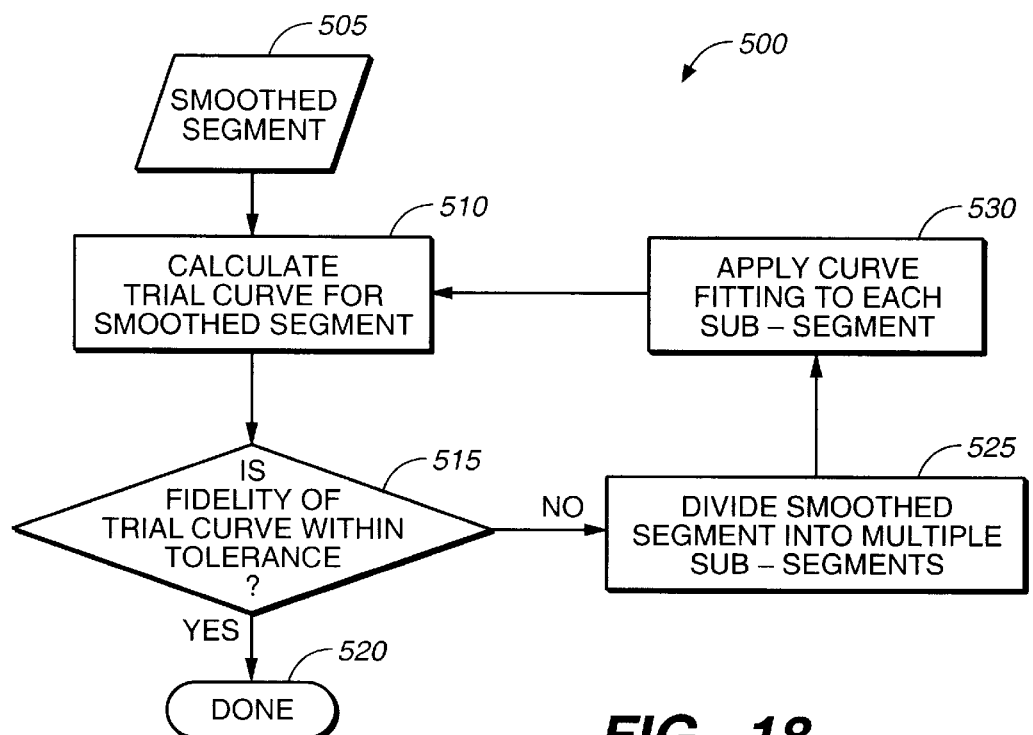
FIG._18
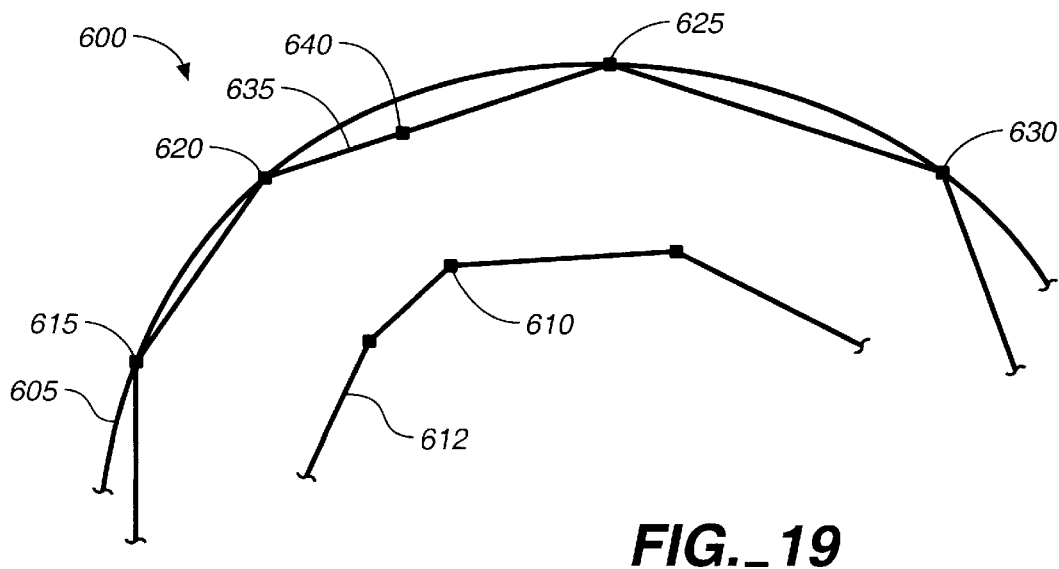
FIG._19

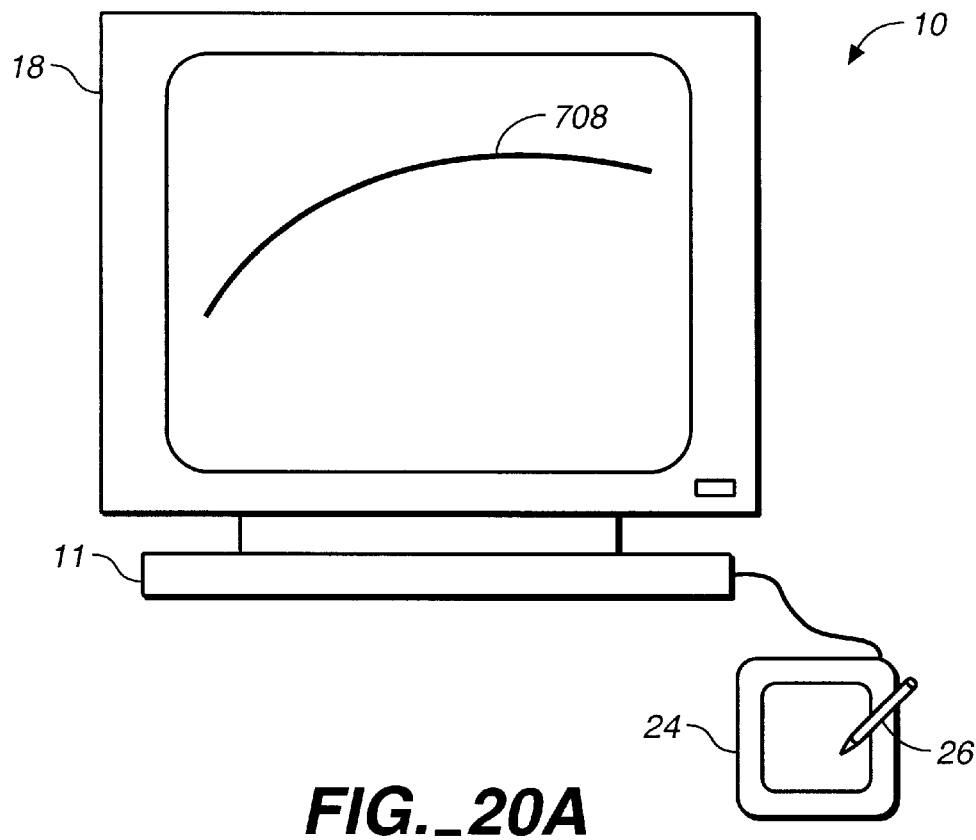
FIG._20A
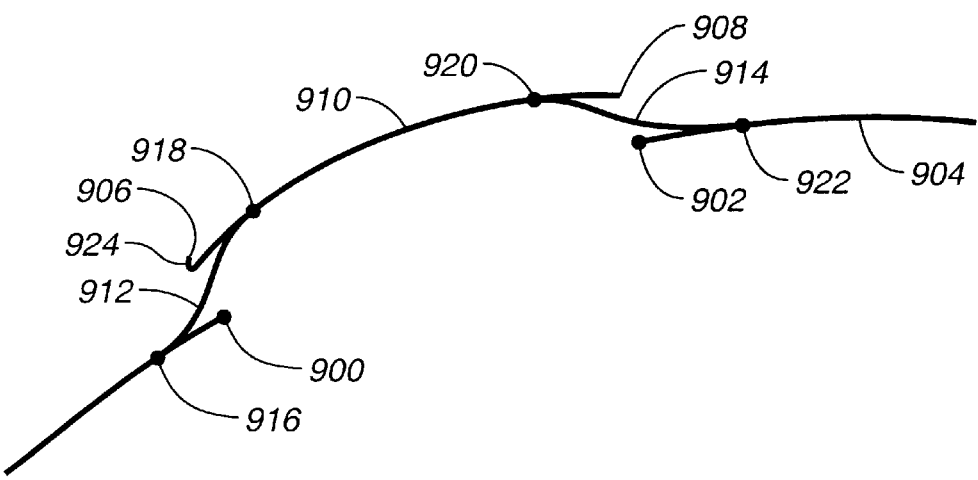
FIG._22

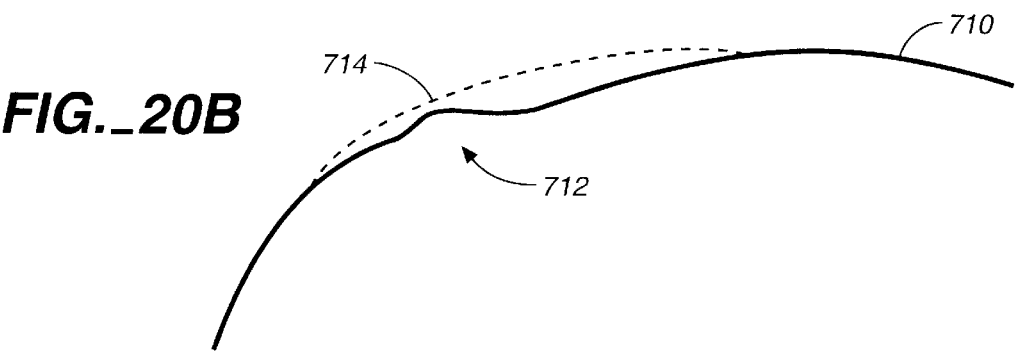
FIG._20B
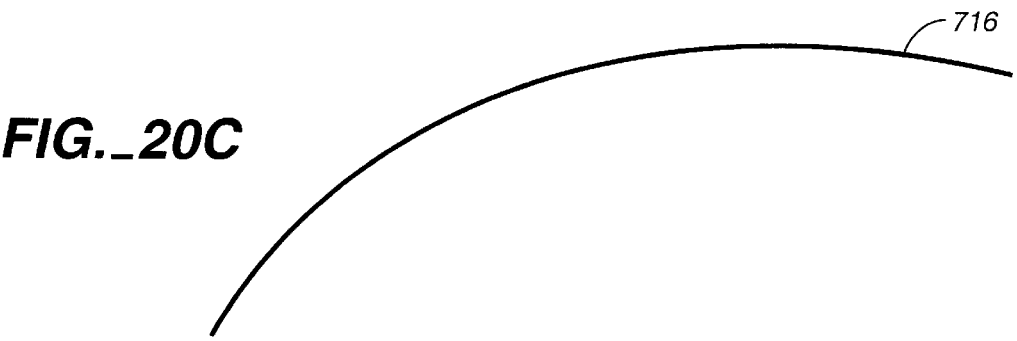
FIG._20C
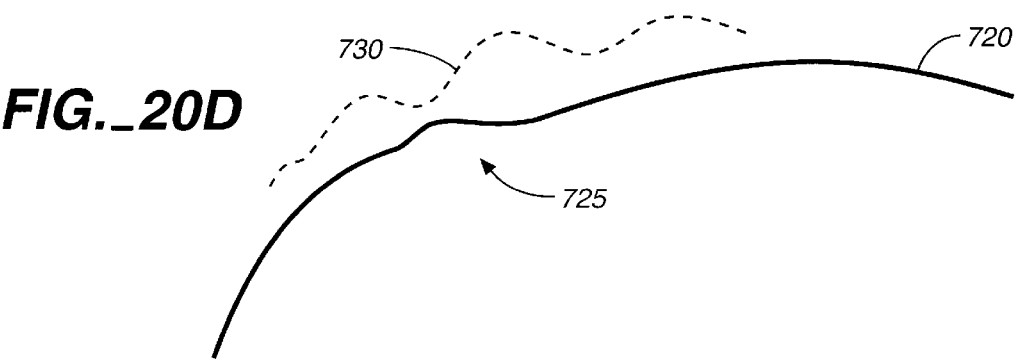
FIG._20D
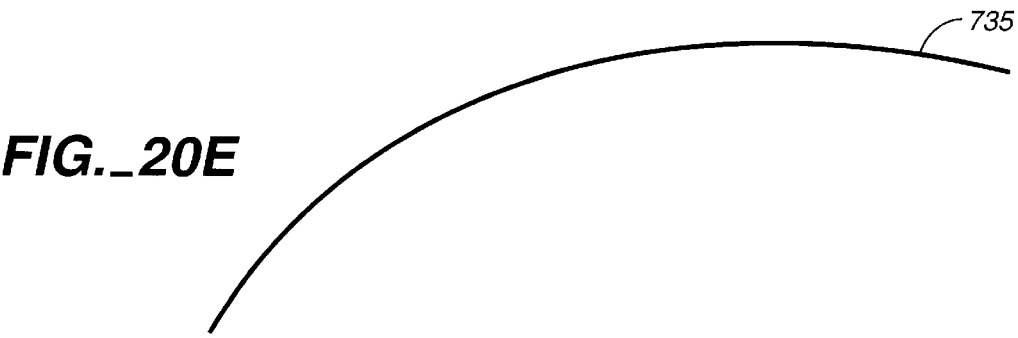
FIG._20E

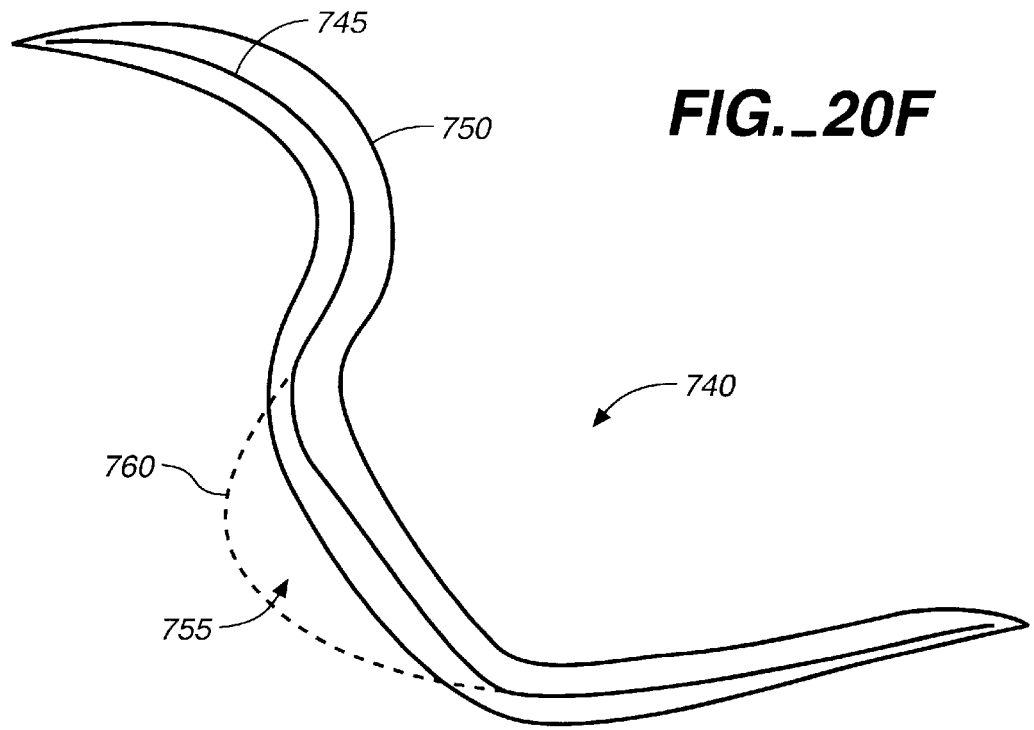
FIG._20F
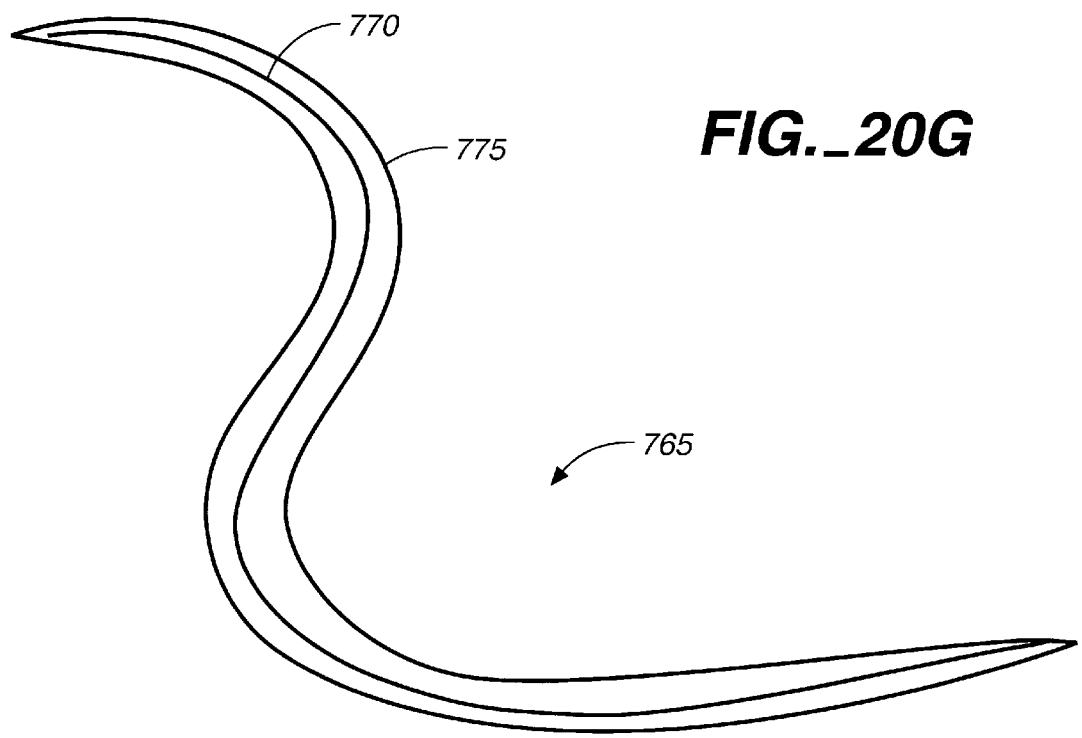
FIG._20G

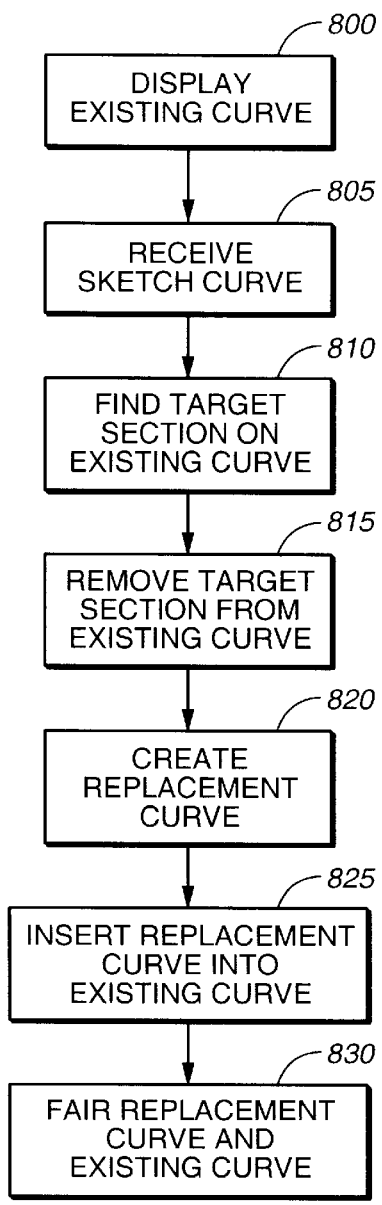
FIG._21
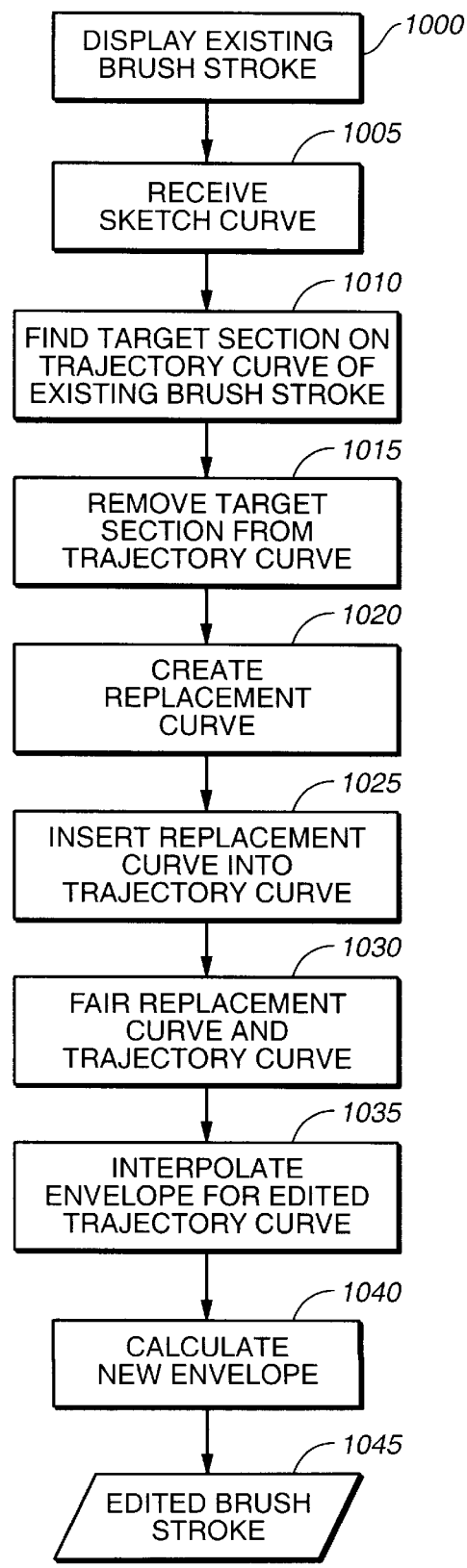
FIG._23

BRUSHSTROKE ENVELOPES

BACKGROUND OF THE INVENTION

The present invention relates to computer-implemented methods for determining the envelope of a brush with respect to a trajectory.

Computer painting programs allow the user to "paint" on an electronic image with an onscreen "brush" controlled by an input device such as a mouse. The user may typically select from among a variety of brush shapes, e.g., circle, square, or single pixel. In programs using "brush extrusion," the user drags a brush defined by a bitmap (e.g., a bitmap of a filled square) along a trajectory (i.e., a sequence of points), leaving the image of the brush at each point in the trajectory. In some programs which use brush extrusion, the size and shape of the brush may vary along the trajectory.

A In the so-called "vector brushstroke" approach, the brush is a closed shape, which may be defined, for example, by a sequence of points connected by line segments. When the user draws a stroke by dragging the brush along a trajectory, the program computes from the brush and the trajectory a stroke envelope intended to correspond to the envelope of the stroke. The stroke envelope may then be filled with a color or a texture. Some programs using the vector brushstroke approach allow the horizontal and/or vertical scale of the brush to vary along the trajectory.

Some paint programs allow the user to paint using other input devices, such as drawing tablets. When the user depresses the end of a stylus at a particular location on the drawing tablet, the x and y coordinates of the depression are communicated to the paint program. Some tablets can also detect and transmit the pressure with which the user presses the stylus on the tablet, the angle between the stylus and the tablet (referred to as tilt or elevation), and the angle at which the stylus is rotated relative to the plane of the tablet (referred to as azmuth). Some paint programs vary the size and rotation of the brush in proportion to the pressure, tilt, and azmuth of the stylus.

SUMMARY OF THE INVENTION

In one aspect, the invention features generating an envelope enclosing brush instances corresponding to transformations of a brush at points along a trajectory. Points on the brush instances that are furthest from the trajectory are identified, and the identified points are connected based on the trajectory and the relative orientations of the brush instances. The identified points may be a sequence of ordered points. Points in the sequence may be sequentially connected if two consecutive points in the sequence correspond to the same point. Points in the sequence may be sequentially connected if the brush instances to not have similar orientations; otherwise, points in the sequence and at least one point on the brush instances may be sequentially connected.

The relative orientations of the brush instances may be identified based on an angle formed by line segments formed by connecting the identified points. The transformations may be affine transformations. The brush may be a sequence of connected line segments forming a convex polygon. Prior to connecting the identified points, identified points that are within less than a threshold distance of the envelope may be eliminated. Slopes of line segments formed by connecting the identified points may be determined.

Among the advantages of the invention are one or more of the following.

One advantage of the invention is that it generates a discrete approximation of an envelope for brushes that vary according to an arbitrary affine transformation along an arbitrary trajectory. Because any affine transformation may be applied to the brush at any point along the trajectory, envelope approximations may be generated for a wide variety of brush-trajectory combinations. The resulting flexibility provides the user of painting programs with a greater degree of control over painting parameters and a variety wider variety of graphical effects.

Another advantage of the invention is that it can generate tangent information at each point of a generated envelope approximation. Such tangent information is useful for generating curves which are fit to the envelope approximation, resulting in graphical representations of envelopes which appear smoother when rendered on output devices such as computer monitors and printers.

Another advantage of the invention is that it eliminates points from the discrete approximation of the envelope which are on the inside of the envelope and which are very close to the envelope. This results in faster rendering of the envelope approximation on an output device without appreciable loss of accuracy of the envelope approximation. Point elimination also greatly reduces the number of curves necessary to smoothly fit the inside of a curving envelope.

Other features and advantages of the invention will become apparent from the following description and from the claims.

BRIEF DESCRIPTION OF THE DRAWINGS

FIG. 1 is a block diagram of a computer and computer elements.

FIG. 2 is a flowchart of a method for generating a filled envelope from a user-drawn stroke.

FIG. 3 is a diagram of a polygonal brush.

FIG. 4A is a side view of a drawing tablet and a stylus.

FIG. 4B is a top view of a drawing tablet and a stylus.

FIG. 5 is a diagram of a polygonal approximation to a trajectory.

FIG. 6 is a flowchart of a method for generating a discrete approximation of the envelope of a stroke.

FIG. 7 is a flowchart of a method for identifying points on brush instances which are furthest from a side of a line segment.

FIG. 8 is a block diagram of lines drawn from a line segment to a brush instance.

FIG. 9 is a flowchart of a method for connecting points to form a side of an envelope approximation.

FIGS. 10 and 11 are diagrams of polygonal approximations to a trajectory.

FIG. 12 is a diagram of an envelope approximation.

FIGS. 13A and 13B are diagrams of envelope approximations susceptible to shortcut optimization.

FIGS. 14A, 14B, and 14C show a technique of curve smoothing applied to an open sequence of points.

FIGS. 14D, 14E, and 14F show the technique of curve smoothing applied to a closed sequence of points.

FIG. 15 is a flowchart of the technique of curve smoothing.

FIG. 16 is a flowchart of a process for finding corner points.

FIG. 17A is a flowchart of a process for smoothing a segment when the original sequence of points is a closed sequence.

FIG. 17B is a flowchart of a process for smoothing a segment when the original sequence of points is an open sequence.

FIG. 18 is a flowchart of a process for fitting curves to smoothed segments.

FIG. 19 illustrates calculating a fidelity criterion for a point.

FIG. 20A illustrates an implementation of the computer system of FIG. 1.

FIGS. 20B to 20G illustrate a curve being modified.

FIG. 21 is a flowchart of a technique for editing a curve.

FIG. 22 shows fairing between an existing curve and a replacement curve.

FIG. 23 is a flowchart of a technique for editing a brush stroke.

DETAILED DESCRIPTION

Brushstroke Envelope

In the brush-trajectory model, a stroke is built by sweeping a brush (i.e., a closed shape) along a central trajectory (i.e., a sequence of points). The shape of such a stroke is mathematically defined as an envelope enclosing the path of the brush along the trajectory.

Referring to FIG. 1, a computer system 10 includes a general-purpose computer 11 including a brushstroke process 14 for computing a discrete approximation of an envelope approximation 17 for a polygonal brush 15 that varies according to an arbitrary affine transformation along a trajectory 60. The brushstroke process 14 may be implemented, for example, as a feature of a paint application 12, such as Adobe Illustrator®, available from Adobe Systems Incorporated of San Jose, Calif. The computer system 10 also includes a monitor 18 for visually displaying output of the computer 11 and a hard disk drive 28 for persistently storing data. Input devices include a keyboard 20, a mouse 22, and a drawing tablet 24 in combination with a stylus 26.

Referring to FIGS. 2 and 3, within the paint application 12 the user selects 40a a brush 15 with which to paint. The brush 15 is a data structure storing a sequence $b_j$ of J points, where j=1, 2, ..., J, and where $b_O$ is a point at the origin. As shown in FIG. 3, the brush 15 is pentagon-shaped, having five points 52a–e. Point 52f is at the origin. The user can draw with the brush 15 using an input device such as a mouse 22 or a drawing tablet 24. The following discussion assumes that the user draws using a stylus 26 on the drawing tablet 24.

When the user presses 40b the stylus 26 on the drawing tablet 24, indicating that the user is about to begin drawing a new stroke, the paint application 12 clears 40c the trajectory 60. As the user moves the stylus 26 while pressing the stylus 26 on the drawing tablet 24, the drawing tablet 24 periodically sends to the paint application 12 samples of the location (i.e., x and y coordinates), pressure (i.e., how hard the user is pressing the stylus 26 on the drawing tablet 24), and tilt and azimuth angles of the stylus 26 with respect to the drawing tablet 24. As shown in FIG. 4A, the tilt of the stylus 26 (also referred to as the elevational angle) is the out-of-plane angle 54 between the stylus 26 and the plane of the drawing tablet 24. As shown in FIG. 4B, line 27 represents a "shadow" of the stylus 26 cast on the drawing tablet 24. The azimuth angle of the stylus 26 is the in-plane angle 56 between a plane perpendicular to the plane of the drawing tablet 24 and the line 27.

Typical sampling rates of drawing tablets are in the range of 100 times per second. Each time a sample is taken, sample information (i.e., location, pressure, tilt, and azimuth) is transmitted to the paint application 12, which transforms the sample information into a trajectory matrix representing an affine transformation to be applied to the brush data structure 15. The paint application 12 appends 40d the trajectory matrix to the trajectory 60 to produce a sequence of trajectory matrices. When the user releases 40e the stylus 26 from the drawing tablet 24, the paint application 12 determines that the user has stopped drawing the stroke. The resulting trajectory 60 is a sequence of trajectory matrices $t_k$, k=1, 2, ..., K, where K is the number of samples obtained from the drawing tablet 24.

A trajectory matrix $t_k$ contains horizontal and vertical scales $s_x$ and $s_y$, horizontal and vertical offsets $t_x$ and $t_y$, and horizontal and vertical rotations $r_x$ and $r_y$. The shape of the brush 15 at each point along trajectory 60 is defined as $b_{kj}=t_k*b_j$, where * denotes matrix multiplication. For a given k and for j=1, 2, ..., J. the points $b_{kj}$ therefore define the size and shape of the brush 15 at the point in the trajectory 60 corresponding to $t_k$. In other words, $b_{kj}$ is the result of applying the affine transformation defined by $t_k$ to the brush 15.

A trajectory matrix can be derived from the sample information provided by the drawing tablet 24 in many ways. Typically, $t_x$ and $t_y$ in the trajectory matrix are assigned the values of the x and y coordinates, respectively, in the sample information. The components $s_x$ and $s_y$, respectively, may be assigned values proportional to the pressure information contained in the sample information, effectively allowing the user to increase and decrease the size of the brush 15 along the trajectory 60 by varying the pressure on the stylus 26. The values of $r_x$ and $r_y$, respectively, may be a function of the tilt and azimuth angles of the stylus, effectively allowing the user to rotate the brush 15 along the trajectory 60 by changing the tilt and azimuth angles of the stylus 26.

After the paint application 12 finishes generating the trajectory 60, the paint application 112 calls 40f the brushstroke process 14 to generate an envelope approximation 17 of the brush 15 along the trajectory 60. The paint application 12 fills 112 the inside of the envelope approximation 17 with a color or a texture.

Referring to FIG. 5, the brushstroke process 14 represents the trajectory 60 graphically as a path 70. The trajectory 60 has three trajectory matrices $t_1$, $t_2$, and $t_3$, represented graphically as points 72a, 72b, and 72c respectively. The x-y coordinates of points 72a–c correspond to the $t_x$ and $t_y$ components of trajectory matrices $t_1$, $t_2$, and $t_3$, respectively. Line segments 74a and 74b connect consecutive points 72a–c. The results of applying the affine transformations defined by the trajectory matrices $t_1$, $t_2$, $t_3$, of the trajectory 60 to the brush 15 are represented graphically as brush instances 76a–c. Although the brushstroke process 14 need not render the path 70 or the brush instances 76a–c to calculate the envelope approximation 17, the path 70 and brush instances 76a–c are shown here for illustrative purposes.

Referring to FIG. 6, the brushstroke process 14 generates 40f the envelope approximation 17 as follows. The brushstroke process 14 finds the points on brush instances 76a–c which are furthest from the left side of the path 70. A variable side is assigned 42a a value of LEFT, indicating that the brushstroke process 14 should look to the left of the path 70. The brushstroke process 14 initializes 42b an indexing variable k to a value of 1. The brushstroke process 14 identifies 42c the line segment in the path 70 connecting the point representing the trajectory matrix $t_{k-1}$ to the point representing the trajectory matrix $t_k$ and the line segment in the path 70 connecting the point representing the trajectory matrix tk to the point representing the trajectory matrix $t_{k+1}$. For the example of FIG. 5, line segments 74a and 74b are identified.

The brushstroke process 14 identifies 42e the brush instances containing the points corresponding to $t_{k-1}$, $t_k$, and $t_{k+1}$. In the case of FIG. 5, brush instances 76a, 76b, and 76c are identified. For each identified line segment, the brushstroke process 14 finds 42f the points on the boundaries of the brush instances containing the line segment that are furthest from the side of the line segment indicated by the value of the variable side. In FIG. 5, for example, the point 80a is the point in brush instance 76a that is furthest to the left of line segment 74a, and the point 80b is the point in brush instance 76b that is furthest to the left of line segment 74a. Details of a process for finding points of the brush instances 76a–c furthest from a side of the identified line segments will be described in FIG. 7. The envelope generation process 40f connects 42g points identified in 42f, as described in more detail with respect to FIG. 9.

After connecting 42g points, if the indexing variable k is not equal to K−1, then k is incremented 42i, and control returns to the process 42c–42g, which is repeated to continue generating the rest of one side of the envelope approximation 17. After the left side of the envelope approximation 17 has been generated, the variable side is assigned 42k a value of RIGHT, and the right side of the envelope approximation 17 is generated according to the process 42b–42i. After the right side of the envelope approximation 17 has been generated 40f, the brushstroke process 14 returns, at which point the paint application 12 may, for example, fill the envelope approximation 17 with a color or a pattern.

Referring to FIG. 7, the brushstroke process 14 identifies the points in a pair of consecutive brush instances that are furthest from a specified side of a specified line segment as follows. The brushstroke process 14 draws 44a perpendicular lines from the specified side of the line segment to the boundary of the first brush instance. As shown in FIG. 8, line segments 78 are drawn perpendicular to the left side of line segment 74a. The brushstroke process 14 selects 44b as a first candidate point the point on the first brush instance connected to the longest of the perpendicular line segments 78. As shown in FIG. 8, the line segment touching point 80a is the longest of the line segments 78, and therefore point 80a is selected as the first candidate point.

The brushstroke process 14 draws 44c a second line and selects 44d a second candidate point on the second brush instance in the same manner as that described above. The brushstroke process 14 draws 44e a new line segment between the first and second candidate points, and repeats the processes 44a–44d using the new line segment to identify 44f a new first candidate point and a new second candidate point. The new first candidate point and previous candidate point are compared 44g. If the new first candidate point differs from the first candidate point or the new second candidate point differs from the second candidate point, then the process 42f assigns 44i the new first candidate point as the first candidate point and the new second candidate point as the second candidate point, and processes 44e–44g are repeated.

When the new first and second candidate points are the same as the first and second candidate points, the brushstroke process 14 identifies 44h the first and second candidate points as the points furthest from the indicated side of the line segment. As shown in FIG. 5, the points 80a and 80b are identified as being furthest to the left of line segment 74a, and the points 80b and 80c are identified as being furthest to the left of line segment 74b.

It is possible that the sequence of processes 44e–44i will repeat without terminating naturally. To avoid this possibility, the brushstroke process 14 may terminate the loop after it repeats more than a predetermined number of times and eliminate one of the endpoints of the line segment from the trajectory 60.

Referring to FIG. 9, the brushstroke process connects 42g the points identified in 42f to form one side of the envelope approximation as follows. Let $b_{k-1,w}$ and $b_{k,x}$ be the points of $b_{k-1,j}$ and $b_{k,j}$, respectively, that lie furthest to the left of the line ($b_{k-1,w}$, $b_{k,x}$). For example, as shown in FIG. 5, point $b_{k-1,w}$ is point 80a and point $b_{k,w}$ is point 80b, because points 80a and 80b are the points of brush instances 76a and 76b, respectively, that lie furthest to the left of the line segment 74a. Similarly, point $b_{k,y}$ is point 80b and point $b_{k+1,z}$ is point 80c, because points 80b and 80c are the points of brush instances 76b and 76c, respectively, that lie furthest to the left of the line segment 74b.

If, 46a, point $b_{k,x}$ is the same point as $b_{k,y}$, then the brushstroke process 14 connects 46b the point $b_{k-1,w}$ to the point $b_{k,x}$ and connects 46c point $b_{k,x}$ to the point $b_{k+1,z}$. FIG. 5 is an example of a situation in which $b_{k,x}$ is the same point as $b_{k,y}$, resulting in line segments 82a and 82b.

If, 46d, point $b_{k,x}$ is not the same point as $b_{k,y}$, but brush instances 76a, 76b, and 76c have similar relative orientations, then the brushstroke process 14 connects 46e point $b_{k-1,w}$ to point $b_{k,x}$, connects 46f all points between point $b_{k,x}$ and $b_{k,y}$, inclusive, and connects 46g point $b_{k,y}$ to point $b_{k+1,z}$. FIG. 10 is an example of a situation in which point $b_{k,x}$ is not the same point as $b_{k,y}$, but brush instances 84a–c have similar relative orientations, resulting in line segments 86a–c. If additional points existed on brush instance 84b between points $b_{k,x}$ and $b_{k,y}$, then those points would be connected.

The brushstroke process 14 considers three brush instances to have similar relative orientations at $t_k$ if and only if:

$$\text{angle}(b_{k,x}-b_{k-1,w},\ b_{k+1,z}-b_{k,y})<0 \qquad \text{Equation 1}$$

For vectors a and b, the function angle(a, b) is defined as the signed angle between a and b:

$$\text{angle}(a,b)=\text{sign}(\text{cross}(a,b))*\text{acos}(\text{dot}(a,b)/(|a||b|)) \qquad \text{Equation 2}$$

The function cross(a, b) in Equation 2 calculates the cross product of vectors a and b. The function sign(cross(a, b)) in Equation 2 calculates the sign of the cross product of a and b, resulting in a scalar value of either +1 or −1. The function dot(a, b) in Equation 2 calculates the dot product of vectors a and b, which is a scalar value. The values |a| and |b| in Equation 2 represent the magnitudes of vectors a and b, respectively. The function acos in Equation 2 calculates the arc cosine of its argument. The result of Equation 1 is to produce a signed scalar value representing the signed angle between vectors a and b.

If neither the criterion of 46a or 46d is satisfied, then the brushstroke process 14 connects 46h point $b_{k-1,w}$ to point $b_{k,x}$, connects 46i point $b_{k,x}$ to point $b_{k,y}$, and connects 46j point $b_{k,y}$ to point $b_{k+1,z}$. FIG. 11 shows such a case. Any points between $b_{k,x}$ and $b_{k,y}$ are not connected because they lie on the inside of the envelope and are therefore superfluous. Points $b_{k,x}$ and $b_{k,y}$ are marked 46k as break points. The line segments formed by connecting points in the process 46a–258 are added 262 to the envelope approximation 17.

Referring to FIG. 12, the resulting envelope approximation 17 corresponding to the brush 15 and trajectory 60 represented in FIG. 5 includes line segments 82a, 82b, 82c, and 82d.

Some paint applications 12 may apply a curve fitting technique to the envelope approximation 17 to produce a smooth curve corresponding to the envelope approximation 17. A preferred technique is described below in conjunction with FIG. 14A–19. In such cases the brushstroke process 14 may delete points from the envelope which are within less than a predetermined distance of the envelope approximation 17 using a process referred to as "shortcut optimization." For example, referring to FIG. 13A, the point $b_{k,y}$ is deleted from the envelope approximation 17 if the distance d2 is less than a predetermined threshold, and the point $b_{k,x}$ is deleted from the envelope approximation 17 if the distance d1 is less than a predetermined threshold. If a point is deleted from the envelope approximation 17, the point preceding the deleted point is connected to the point following the deleted point. For example, if point $b_{k,y}$ is deleted from the envelope approximation 17, then point $b_{k-1,w}$ is connected to point $b_{k,x}$. If both points $b_{k,y}$ and $b_{k,x}$ are deleted from the envelope approximation 17, then point $b_{k-1,w}$ is connected to point $b_{k+1,z}$. As shown in FIG. 13B, a long trajectory 90 includes a sharp corner 96. One of the two sides 92a–b of the envelope approximation corresponding to the trajectory 90 contains a line segment 94 which is susceptible to deletion by shortcut optimization.

If the paint application 12 applies a curve fitting technique to the envelope approximation 17, the brushstroke process 14 may store in the envelope approximation 17 the slope of each line segment in the envelope in order to aid the curve fitting process. If shortcut optimization is applied to the envelope approximation 17, as described above, then storage of slopes occurs after shortcut optimization is performed.

Curve Smoothing

Referring to FIGS. 14A to 14C an application of curve smoothing to an original open sequence of points is shown. One source of the original sequence of points could be provided from the envelope generation process mentioned above. In FIG. 14A, the original sequence of points 100 is an ordered sequence of points received as input in an interactive graphics system in response to drawing gestures by a user. A noise filter may be applied to the original sequence 100 to remove high-frequency noise, generating a filtered sequence of points 105. The noise filter removes high frequency variations (i.e., noise) while preserving lower frequency curve features. The filtered sequence 105 is divided into one or more segments. By evaluating the curvature at each filtered point, corner points are found in the filtered sequence. In FIG. 14A, one corner point 110 is present in the filtered sequence 105. A first segment of filtered points 115 extends from an end point 120 of the sequence 100 to the corner point 110. A second segment 125 extends from the corner points 110 to a second end point 130. In the figures, the points of sequences 100 and 105, and of other sequences of points, are shown connected by line segments. This is done for clarity of illustration only: the line segments are not elements of the sequences of points.

Each segment is smoothed, as shown in FIG. 14B. The first segment of filtered points 115 is smoothed to generate a first smoothed segment of points 135. The second segment of filtered points 125 is smoothed to a generate a second smoothed segment 140. The smoothed segments 135, 140 are smoother than the filtered sequence 105.

Curves are fit to the smoothed segments, as shown in FIG. 14C. A trial curve is created and the fidelity of the trial curve to the smoothed segment is evaluated. If the trial curve is not sufficiently faithful to the smoothed segment, the smoothed segment is divided into sub-segments and the curve fitting process is repeated for each sub-segment. Thus, the first smoothed segment 135 is divided into four curves 145, 150, 155, and 160, separated by break points 147, 152, and 157. The second smoothed segment 140 is simpler than the first smoothed segment 135 so a single curve 165 was able to be fit to the second smoothed segment 140. The curves 145, 150, 155, 160, and 165 together represent the original sequence of points 100.

Referring to FIGS. 14D, 14E, 14F the process for a closed sequence of points is shown. The overall process is not different from that of the open sequence. The details of smoothing are different for closed sequences with no corners, as described below. FIG. 14D shows an original sequence of points 170 and a filtered sequence of points 175, generated by applying a noise filter to the original sequence 170. There are no corner points in the filtered sequence 175. Thus, there is one segment of points. The segment is a closed sequence of points. For convenience, a point 180 where the original sequence 170 begins is treated as both a first and second end point of the segment. FIG. 14E shows the filtered sequence of points 175 and a smoothed segment of points 185 generated by smoothing the segment of points 180 shown in FIG. 14D. FIG. 14F shows the smoothed segment of points 185 divided into two curves 190, 195 separated by a break point 192 and a break point 194 derived from smoothing the end point 180. The two curves 190, 195 form a representation of the original sequence of points 170.

Referring to FIG. 15, a method 200 of fitting a curve to a sequence of points, includes a system that receives an original sequence of points 202. The original sequence of points 202 is an ordered sequence of points. The system can receive the original sequence as input from a user input device such as a mouse or graphics tablet in response to freehand gestures of a user. Alternatively, the original sequence of points 202 may be supplied from such sources as a data file, a computer software application, or a signal processing system.

The system optionally applies a noise filter to the original sequence of points 200 to generate a sequence of filtered points (which may also be referred to as a filtered sequence) (step 205). One benefit of noise filtering is that is removes large abrupt isolated variations among points, such as a spike. These extreme variations are most likely the result of user error in entering the original sequence of points or corrupt or noisy data and so it is generally not desirable to keep these points for curve fitting.

One suitable and advantageous noise filter is based on a low-pass $\lambda$-$\mu$ filter introduced in "Optimal Surface Smoothing as Filter Design" by G. Taubin, T. Zhang, and G. Golub, in Technical Report RC-20404, IBM Research, March 1996, herein incorporated by reference. An implementation of this noise filter is as a degree d$\lambda$-$\mu$ filter with a transfer function $f^d(k)$ given by $$f^d(k) = ((1-\lambda k)(1-\mu k))^{d/2}$$

for frequencies k, $0 \leq k \leq 2$, $0 < \lambda < -\mu$, and d even. $\lambda$ and $\mu$ are defined so that $f^2(p) = 1$ $f^2(2) = h$ holds true for a pass-band frequency p, $0 < p < 1$, and high-frequency tolerance h, $0 < h < 1$. The pass-band extends from k=0 to k=p, where $f^d(k)$–1. As k increases from k=p to k=2, $f^d(k)$ decreases monotonically to $h^{d/2}$. Thus, $$= \frac{p(1-h) - \sqrt{(h-1)(p(p(h-1)+8)-16}}{4(p-2)}$$

$$a = \frac{p(1-h) + \sqrt{(h-1)(p(p(h-1)+8)-16)}}{4(p-2)}$$

Values for p, h, and d may vary with the expected noise spectrum. For original sequences of points received as input from digitizing mice and graphics tablets, $p \approx 1/10$, $h \approx <1/10$, and $d \approx 4$ produce good results with little loss of fidelity.

Noise filtering is performed in multiple passes on the original sequence. The original sequence has n points and is denoted as s and each point is denoted as $s_i$, where $i=1, \ldots, n-1$. A number of passes equal to the degree d of the transfer function $f^d(k)$ are performed for $j=1, \ldots, d$, as follows $$s_i^0 = s_i$$

$$s_i^j = s_i^{j-1} - \lambda \Delta s_i^{j-1}$$

where j is odd $$s_i^j = s_i^{j-1} - \mu \Delta s_i^{j-1}$$

where j is even

The discrete Laplacian $\Delta s$ of the original sequence s is defined as $$\Delta s_i = s_i - \frac{1}{2}(s_{i-1} + s_{i+1})$$

If the original sequence s is a closed sequence of points, the indices i, j are incremented and decremented modulo n in the noise filtering equations above. If the original sequence s is an open sequence, $$\Delta s_{n-1} = 0$$

$$\Delta s_0 = 0$$

so the positions of the end points of the original sequence remain invariant.

The system divides the sequence of points (which may or may not be filtered for noise as indicated above) into one or more segments (step 210). To do so, the system finds break points in the sequence of points. Each end point of the sequence is a break point. Corner points are also break points.

Corner points are points in the sequence of points which have a high estimated curvature. As shown in FIG. 16, in performing a method 300 for finding corner points in a sequence of points, a system calculates an average angle for points within a certain distance of a point 302 which precede the point 302 in the ordered sequence and an average angle for points within the same distance which succeed the point 302 in the ordered sequence (step 305). Alternatively, the distance may be different for preceding and succeeding points. The average angle for a group of points is calculated by averaging the angle from each point relative to a reference line through the original point 302. The estimated curvature for the point 302 is calculated by comparing these average angles (step 310). The system compares the estimated curvature for the point 302 with a curvature tolerance (step 315). Points which have an estimated curvature greater than or equal to the curvature tolerance are corner points (step 320). Points which have an estimated curvature less than the curvature tolerance are not corner points (step 325).

One implementation of corner finding is based on a method in "A Curve Fitting Algorithm for Character Fonts" by K. Itoh and Y. Ohno, in Electronic Publishing, 6(3):195–206, September 1993, herein incorporated by reference. In this implementation, the estimated curvature $c_i$, $-1 \leq c_i \leq 1$, at each point $s_i$ in the original sequence is defined as $$c_i = \frac{a_i \cdot b_i}{|a_i||b_i|}$$

where vectors $a_i$ and $b_i$ are sums of normalized vector differences between point $s_i$ and preceding and succeeding points $s_x$ and $s_y$ within a bounded chord-length of $s_i$. If the original sequence of points $s_i$ is an open sequence, $a_i$ and $b_i$ are defined as $$a_i = \sum_x \frac{(s_i - s_x)}{|s_i - s_x|}$$

$$b_i = \sum_y \frac{(s_i - s_y)}{|s_i - s_y|} \qquad \text{where } 0 \leq x < i \text{ such that}$$

$l_{x+1} > l_i - 1$, and $i < y \leq n-1$ such that $l_{y-1} < l_i + 1$ for a corner chord-length tolerance l. The chord-length $l_i$ for each point $s_i$ is defined as $$l_i = l_{i-1} + |s_i s_{i-1}|$$

$$l_0 = 0$$

If the original sequence is a closed sequence, $a_i$ and $b_i$ range over similarly chord-length bound indices x, y modulo n.

Thus, original points $s_i$ where $c_i \geq c$ are defined as corner points, for a corner angle tolerance c. Values of $1 \gg f$ and $c \approx \cos(2\pi/3)$ produce generally good results, where f is a fidelity tolerance, described below with respect to curve fitting.

The system smooths each segment (step 215). The smoothing technique is different depending on whether the segment is a closed sequence or an open sequence of points. Smoothing a segment removes moderate and higher frequency curvature variations while preserving low-frequency variations. The resulting smoothed segment may be fit with one or more curves efficiently.

A segment that is a closed sequence occurs when the original sequence is a closed sequence and there are no corner points in the original sequence (recall FIGS. 14D to 14F).

Referring to FIG. 17A, in performing a method 400 for smoothing a segment that is a closed segment of points 402, a system calculates a frequency-space representation of the segment (step 405). The frequency-space representation is calculated by taking a discrete Fourier transform of the segment. The system smooths the frequency-space representation of the segment (step 410). The frequency-space representation is smoothed by applying a low-pass filter to the frequency-space representation. The system inverts the smoothed frequency-space representation (step 415). The smoothed frequency-space representation is inverted by taking an inverse discrete Fourier transform of the smoothed frequency-space representation. The inverted smoothed frequency-space representation is a smoothed segment 420.

Referring to FIG. 17B, in performing a method 450 for smoothing a segment that is an open segment of points 452, a system subtracts a linear trend from the segment 452 (step 455). The system calculates a frequency-space representation of the subtracted segment (step 460). The frequency-space representation is calculated by taking a discrete sine transform of the segment. The end points of the subtracted segment are held invariant and so a discrete sine transform produces desirable results. The system smooths the frequency-space representation of the subtracted segment (step 465). The frequency-space representation is smoothed by applying a low-pass filter to the frequency-space representation. The system inverts the smoothed frequency-space representation (step 475). The smoothed frequency-space representation is inverted by taking an inverse discrete sine transform of the smoothed frequency-space representation. The system adds the linear trend previously subtracted to the inverted smoothed frequency-space representation to form a smoothed segment 480 (step 475).

One implementation of smoothing a segment of points is based on a method described in "Local Reproducible Smoothing Without Shrinkage" by J. Oliensis, in IEEE Transactions of Pattern Analysis and Machine Intelligence, 15(3):307–3232, March 1993, herein incorporated by reference. In addition, the smoothing technique is constrained in a manner proposed by Taubin in "Optimal Surface Smoothing as Filter Design", noted above. In this implementation, the reduction of the total spectral power of the segment is bounded by a smoothness tolerance s, where s is a small number.

For a closed segment $t_z$ of m points, $z=0, \ldots, m-1$, a discrete Fourier transform of the segment $t_z$ is taken to form the segment's frequency-space representation $\hat{t}_z$. The frequency-space representation $\hat{t}_z$ is defined as $$\hat{t}_0 = \sqrt{\frac{1}{m}} \sum_{r=0}^{m-1} t_r$$

$$\hat{t}_z = \sqrt{\frac{1}{m}} \sum_{r=0}^{m-1} t_r \cos\left(\frac{2\pi\left[\frac{z}{2}\right]r}{m}\right) \quad \text{where } z \text{ is odd}$$

$$\hat{t}_z = \sqrt{\frac{1}{m}} \sum_{r=0}^{m-1} t_r \sin\left(\frac{2\pi\left[\frac{z}{2}\right]r}{m}\right) \quad \text{where } z \text{ is even}$$

This representation expresses the segment $t_z$ in terms of a linear combination of the eigenvectors of the Laplacian operator defined above. For each sample $\hat{t}_z$, let $v_z$ be the corresponding eigenvalue of the eigenvector associated with $\hat{t}_z$ in this decomposition. $v_z$ is defined as $$v_z = 1 - \cos\left(\frac{2\pi\left[\frac{z}{2}\right]}{m}\right)$$

The frequency-space representation $\hat{u}_z$ of a smoothed segment $u_z$ is computed by applying a smoothing filter as follows $$\hat{u}_z = g(v_z)\hat{t}_z$$

A low-pass transfer function g is defined such that $$g(v)=1$$

if $v<v_w$ $$g(v)=g_n$$

if $v=v_w$ $$g(v)=0$$

if $v>v_w$ for frequencies $0 \leq v \leq 2$, with constants w and $g_0$ chosen such that $1 \leq w \leq m-1$ and $0<g_0<1$. Values of w and $g_0$ are chosen so that g reduces the total non-DC (i.e., non-direct current) spectral power present in $\hat{t}_z$ by the smoothness tolerance s so that the following holds true $$\sum_{e=1}^{m-1} |\hat{u}_e|^2 = (1-S)\sum_{e=1}^{m-1} |\hat{t}_e|^2$$

The inverse discrete Fourier transform of the frequency-space representation $\hat{u}_z$ of the smoothed segment is taken to form the smoothed segment $u_z$.

For an open segment $t_z$ of m points, $z=0, \ldots, m-1$, a linear trend in the segment $t_z$ is subtracted to form a subtracted segment $t'_z$ as follows $$t'_z = t_z - \frac{m-1-z}{m-1}t_0 - \frac{z}{m-1}t_{m-1}$$

A discrete sine transform of the subtracted segment $t'_z$ is taken to form the subtracted segment's frequency-space representation $\hat{t}'_z$. The frequency-space representation $\hat{t}'_z$ is defined as $$\hat{t}'_z = \sqrt{\frac{2}{m-1}} \sum_{r=0}^{m-1} t'_r \sin\left(\frac{\pi z r}{m-1}\right)$$

This representation expresses the segment $t'_z$ in terms of a linear combination of the eigenvectors of the Laplacian operator defined above. For each sample $\hat{t}'_z$, let $v_z$ be the corresponding eigenvalue of the eigenvector associated with $\hat{t}'_z$ in this decomposition. $v_z$ is defined as $$v_z = 1 - \cos\left(\frac{\pi z}{m-1}\right)$$

$$v_{m-1} = 0$$

A frequency-space representation a $\hat{u}'_z$ of a smoothed segment $u'_z$ is computed by applying a smoothing filter as follows $$\hat{u}'_z = g(v_z)\hat{t}'_z$$

A low-pass transfer function g is defined such that $$g(v)=1$$

if $v<v_w$ $$g(v)=g_0$$

if $v=v_w$ $$g(v)=0$$

if $v>v_w$ for frequencies $0 \leq v \leq 2$, with constants w and $g_0$ chosen such that $1 \leq w \leq m-1$ and $0<g_0 \leq 1$. Values of w and $g_0$ are chosen so that g reduces the total spectral power present in $\hat{t}'_z$ by the smoothness tolerance s so that the following holds true $$\sum_{e=1}^{m-1} |\hat{u}'_e|^2 = (1-S) \sum_{e=1}^{m-1} |\hat{t}'_e|^2$$

An inverse discrete sine transform of the frequency-space representation of the smoothed segment $\hat{u}'_z$ is taken to form a subtracted segment $\hat{u}'_z$. The linear trend previously subtracted is added to $u'_z$ to form the smoothed segment $u_z$.

In one implementation, to take advantage of O(n log n) fast Fourier and sine transform algorithms, segments are up-sampled by linear interpolation between a sufficient number of adjacent points to have a number of points equal to a power of two.

The system fits one or more curves to each smoothed segment (step 220 of FIG. 15). Referring to FIG. 18, in a method 500 for fitting a curve to a smoothed segment 505, a system calculates a trial curve for the smoothed segment 505 (step 510). The trial curve is a mathematically defined curve, rather than a sequence of points. In one implementation, the trial curve is a parametric curve or a Bezier curve. The system calculates a fidelity criterion of the trial curve for the smoothed segment 505 (step 515). The fidelity criterion is satisfied if for all the points in the smoothed segment there is a point on the trial curve that is within a distance less than or equal to a fidelity tolerance. If the fidelity criterion is satisfied, the trial curve is sufficiently faithful to the smoothed segment 505 and the system stores the trial curve as a representation of the smoothed segment 505 (step 520). If the fidelity criterion is not satisfied, the system divides the smoothed segment 505 into two or more sub-segments (step 525). The system then applies the curve fitting process to each sub-segment (step 530).

Referring to FIG. 19, in a method 600 for calculating the fidelity criterion for a trial curve 605 and a point 610 on the smoothed segment 612, a system generates a sequence of trial points by sampling the trial curve 605. The trial curve is sampled so that the sagittal distance from a chord between consecutive points to the trial curve 605 does not exceed a flatness tolerance. The system finds the normalized distance of the point 610 from the first end point (not shown) of the smoothed segment 612. The normalized distance of the point 610 represents the location of the point 610 on the smoothed segment 612 relative to the end points of the smoothed segment, such as 10%, 50%, etc. Similarly, the normalized distance of a trial point on the trial curve represents the relative location of that trial point on the trial curve. The system then finds a trial point that is the same normalized distance from a first end point (not shown) of the trial curve 605, if such a trial point exists. If such a trial point is found, if the distance from the trial point to the point 610 is less than or equal to the fidelity tolerance the fidelity criterion is satisfied. If no such trial point is found, the system finds two consecutive trial points 620, 625 which are normalized distances from the first end point of the trial curve 605 less than and greater than, respectively, the normalized distance of the point 610 in the smoothed segment 612. For example, if the point 610 has a normalized distance of 55% (representing that the point 610 is 55% of the distance from the first end point of the segment 612 to the second end point), the system finds two trial points where one trial point has a normalized distance less than 55% and one trial point has a normalized distance greater than 55%. The system calculates a chord 635 between the two trial points 620, 625. The system finds a chord point 640 on the chord 635 that is closest to the point 610 in the smoothed segment 612. In an alternative implementation, the chord point 640 is a point on the chord 635 that is the same normalized distance from the first end point of the trial curve 605 as the normalized distance of the point 610 in the smoothed segment 612. The fidelity criterion is satisfied if any of the following are true: (1) the distance from the point 610 in the smoothed segment to the trial point 620 is less than or equal to the fidelity tolerance; (2) the distance from the point 610 in the smoothed segment to the trial point 625 is less than or equal to the fidelity tolerance; (3) the distance from the chord point 640 is less than or equal to a fraction of the fidelity tolerance, where the fraction is based on the flatness tolerance.

One implementation of curve fitting is based on a method described in "Real Time Fitting of Hand-Sketched Pressure Brushstrokes" by T. Pudet, in Eurographics Proceedings, 13(3):205–220, 1994, herein incorporated by reference. In this implementation, the system calculates estimates of tangent vectors at end points of the smoothed segment using a local quadratic interpolate over all points in the smoothed segment within a chord-length θ≈2f of the end points, for a fidelity tolerance f. The system fits a Bezier segment as a trial curve with constrained end points and tangents to the smoothed segment using least squares with a normalized chord-length parameterization. The tangent continuity constraints are handled by fitting both x and y components simultaneously using a method described in "Curve-Fitting with Piecewise Parametric Curves" by M. Plass and M. Stone, Graphics Proceedings, Annual Conference Series, 17(3):229–239, July 1983.

In this implementation, the system evaluates the fidelity of the fit using the following technique. As described above, if the fit is not faithful enough, the smoothed segment is subdivided into two parts and the technique is repeated recursively on both sub-segments until the entire smoothed segment has been successfully fit.

Thus, given the smoothed segment $\phi_\psi$ of γ points, $\psi=0, \ldots, \gamma-1$, with chord-length $\theta_\psi$, and the trial curve b(T), the fit is faithful enough if for all $\phi_\psi$ there exists a $T_i$, $0 \leq T_i \leq 1$ such that $|\phi_\psi - b(T_i)| \leq f$ for the fidelity tolerance f. Specifically, this test is implemented as follows.

The system computes a polygonal approximation of the trial curve b(T) within a flatness ϵf, where 0<ϵ<1. The polygonal approximation consists of α points $\Phi_\omega$ with chord-length $\Theta_\omega$, where $\omega=0, \ldots, \alpha-1$. For each point $\phi_\psi$ in the smoothed sequence, $\Phi_{\omega_\psi}$ is a unique point in the polygonal approximation such that $$\frac{\Theta_{\omega_\psi}}{\Theta_{\alpha-1}} \leq \frac{\theta_\psi}{\theta_{\gamma-1}} < \frac{\Theta_{\omega_\psi+1}}{\Theta_{\alpha-1}}$$

$\Omega_{\omega_\psi}$ is a point on a line through $\Phi_{\omega_\psi}$ and $\Phi_{\omega_\psi+1}$ nearest to the point $\phi_\psi$.

By the definition of the polygonal approximation and the triangle inequality, b(T) is faithful, satisfying the fidelity criterion described above, if for all points $\phi_\psi$ of the smoothed segment any of the following conditions holds true $$|\phi_\psi - \Phi_{\omega_\psi}| \leq f$$

$$|\phi_\psi - \Phi_{\omega_\psi+1}| \leq f$$

$$|\phi_\psi - \Omega_{\omega_\psi}| \leq (1-\epsilon)f$$

where $\Omega_{\omega_\psi}$ lies on a chord between $\Phi_{\omega_\psi}$ and $\Phi_{\omega_\psi+1}$.

Similar to the termination test described by Pudet, this technique can be performed efficiently for all points $\phi_\psi$ in the smoothed segment in one pass by traversing the points $\Phi_\omega$ of the polygonal approximation and the points $\phi_\psi$ of the smoothed segment in parallel, stopping as soon as the fidelity criterion is not satisfied for some point $\phi_\psi$.

The length of the polygonal approximation varies inversely with $\sqrt{\epsilon}$. By reducing the value of $\epsilon$, the added expense of computing a longer polygonal approximation is traded off with the smaller probability of concluding the trial curve is not faithful enough, when in fact the trial curve may be satisfactory. Consequently, a value of $\epsilon=\frac{1}{16}$ is preferred for producing generally desirable results.

Editing of Curves

Referring to FIGS. 20A to 20G different aspects of sketch-based editing in a computer graphics system are shown. One technique of sketch-based editing replaces a portion of a curve with a substitute curve. Another technique smooths a portion of a curve in response to a drawing gesture of a user. A third technique applies sketch-based editing to editing brush strokes. The techniques of the curve editing will be described below in the context of a computer graphics system implementation where, through a combination of software and hardware, the system responds to user input to carry out the appropriate technique. In one advantageous implementation, the computer graphics system provides a graphical user interface ("GUI") that presents editing tools which may perform the techniques of curve editing when selected and applied by the user.

Referring to FIG. 20A, an implementation 700 of the computer system 10 (FIG. 1) is shown. The system 10 includes the display 18, rendering a curve 708 that was inputted by a user with an input device such as the drawing tablet 24 and stylus 26 (FIG. 1). The system 700 provides various editing tools selectable by a user through a GUI. The tools include a curve editing tool and a curve smoothing tool. The tools may include brush stroke editing and brush stroke smoothing tools or the curve editing and smoothing tools may be applied to brush strokes to achieve the results of the technique for brush strokes described below.

Referring to FIG. 20B a curve 710 is shown. The curve 710 (as well as the illustrations in FIGS. 20C to 20G) is displayed on the display device 18 of the implementation 700 shown in FIG. 20A. The user, an artist, may wish to edit a portion 712 of the curve 710. The artist draws a sketch curve 714 near the portion 712 of the curve 710 that the artist wants to change using a curve editing tool. As shown in FIG. 20C, by operation of the system which will be described below the sketch curve 714 replaces the undesirable portion 712 and a new curve 716 results.

Referring to FIG. 20D, another curve 720 is shown. Again, the artist may want to change a portion 725 of the curve 720. The artist draws a sketch curve 730 near the undesirable portion 725 of the curve 720 using a smoothing tool. As shown in FIG. 20E, the undesirable portion 725 of the curve 720 is smoothed resulting in a new curve 735 which is preferably smoother than the original curve 720.

Referring to FIG. 20F a brush stroke 740 is shown. The brush stroke 740 has a trajectory curve 745 and an envelope curve 750. The trajectory curve defines a centerline the brush stroke 740 follows. The envelope curve 750 is made up of one or more curves and is formed from a model brush shape possibly modified by various input parameters from a user input device. An artist may wish to change a portion 755 of the brush stroke 740. The artist draws a sketch curve 760 with a brush stroke editing tool near the brush stroke 740. As shown in FIG. 20G, the sketch curve 760 replaces the portion 755 of the trajectory curve 745 by operation of the system which will be described below. The system forms a new brush stroke 765 using a new trajectory curve 770 and a new envelope curve 775 based on the new trajectory curve 770 and envelope information from the original brush stroke 740. Alternately, the portion 755 of the trajectory curve 745 may be smoothed, as described above with respect to FIG. 20D and 20E.

As shown in FIG. 21, sketch-based editing of an existing curve has six general steps. Preliminarily, the user interaction takes place in the context of an existing curve or brush stroke displayed for the artist to view (step 800). The artist makes a drawing gesture which is recorded by a user input device such as a mouse or graphics tablet. The computer graphics system interprets this gesture to generate a sketch curve (step 805). Preferably, the sketch curve is displayed in the system as the artist is gesturing to provide dynamic visual feedback to the artist. The sketch curve may be represented in the system as a mathematical curve, an ordered set of points, or some other form which indicates the content of the artist's gesture.

The system finds a target section in the existing curve (step 810). The sketch curve has two end points. The system finds two targets points on the existing curve. The target points are the points closest to each of the respective end points of the sketch curve. Preferably, the target points are the closest points to the modification end points in Euclidian distance. The section of the existing curve between the target points is the target section. The sketch curve may optionally be edited (e.g., to remove a hook from an end) before the system uses the sketch curve. When an artist draws a sketch curve near more than one existing curve, the system preferably selects as the existing curve the curve which is closest to the sketch curve. Alternately, the artist may select an existing curve through the user interface of the system. The system then determines the target section for that selected curve, despite possibly other existing curves which may be nearer to the sketch curve.

The system removes the target section of the existing curve (step 815). In actual implementation, the target section need not be visibly removed or deleted from the display or any data structures containing the existing curve information. The target section need only be marked so that the system is aware that the target section of the existing curve will be replaced in a later step.

The system creates a replacement curve (step 820). When the artist has selected and used the curve editing tool, the replacement curve is the sketch curve without additional alteration of the target section. Alternately, when the artist has selected and used the smoothing tool, the system smooths the target section and the resulting smoothed target section is the replacement curve.

A variety of smoothing processes may be used to smooth the target section. One example of a preferred smoothing technique is described above in conjunction with FIGS. 14A–19. However, alternate smoothing techniques may be used such as applying a filter to the target section.

The preferred technique of smoothing smooths an ordered sequence of points and fits a curve to the smoothed sequence of points. The system generates an ordered sequence of points to represent the target section. The system chooses a number of points for the ordered sequence that preferably avoids undersampling and oversampling. To choose this number, the system selects a candidate number. The system calculates a candidate sequence of points with a number of points equal to the candidate number. If the spacing between points in this candidate sequence exceeds a maximum spacing tolerance, the candidate number is too low and the process repeats with a higher candidate number. If the spacing is acceptable, the system calculates lines between consecutive points in the candidate sequence. If the distance between each line and the target section between the two points forming the line exceeds a flatness tolerance, the candidate number is too low and the process repeats with a higher candidate number. Once the ordered sequence of points has been formed, the system forms the smoothed target section according to the smoothing process described above.

The system inserts the replacement curve into the existing curve in place of the target section (step 825). Because the replacement curve may not fit exactly in the cutout in the existing curve formed by removing the target section, gaps may remain between the end points of the replacement curve and the existing curve. The system places the replacement curve so that the distance from the end points of the replacement curve to the target points on the existing curve is minimized. In one implementation, the replacement curve is not rotated when it is fit into the cutout, but it may be displaced horizontally and vertically.

The gaps are filled by fairing (step 830). The system generates fillet curves to join the replacement curve and the existing curve smoothly. Once the fairing is complete, the editing is complete. In one implementation, fillet curves are generated using a method described in "A Mark-based Interaction Paradigm for Free-Hand Drawing" by T. Baudel, Proceedings of the ACM Symposium on User Interface Software and Technology, Marina del Rey, Calif., ACM Press, November 1994.

Referring to FIG. 22, fairing is illustrated. When the system calculated the target section, first and second end points 900, 902 for the target section were found on the existing curve 904. The gaps are between the target end points 900, 902 on the existing curve 904 and the insertion end points 906, 908 of the replacement curve 910. The system generates fillet curves 912, 914 joining the existing curve 904 and the replacement curve 910. To produce smooth fillets, the system removes small sections from the existing curve 904 and the replacement curve 910, widening the gaps. The system finds a first fairing point 916 on the existing curve 904. The system finds a second fairing point 918 on the replacement curve 910. The first and second fairing points 916, 918 are distances from their respective end points 900, 906 that are determined based on the distance between the two end points 900, 906. The system finds a third fairing point 920 on the replacement curve 910. The system finds a fourth fairing point 922 on the existing curve 904. Similar to the first and second fairing points 916, 918, the distances between the third and fourth fairing points 920, 922 and their respective end points 908, 902 are based on the distance between those end points 908, 902. The first fillet curve 912 joins the first fairing point 916 and the second fairing point 918. The second fillet curve 914 joins the third fairing point 920 and the fourth fairing point 922. Each fillet curve 912, 914 preferably has end point tangent continuity at each end point 916, 918, 920, 922.

Widening produces smooth fillet curves in fairing the existing curve and the replacement curve. In addition, artifacts at an end of the replacement curve, such as a hook 924, are eliminated by widening the gap. The hook 924 may be caused by unintentional gestures by the artist, such as when a stylus is lifted from a graphics tablet at the end of a stroke.

Referring to FIG. 23 a technique for sketch-based editing of an existing brush stroke 1000 is shown. A technique for drawing brush strokes is described above in conjunction with FIGS. 1–13. A brush stroke includes a trajectory curve and an envelope curve. The trajectory curve defines the centerline of the brush stroke. The envelope curve is formed by applying envelope information to the trajectory curve. The envelope information includes one or more affine matrices of envelope parameters. The envelope parameters are calculated from data preferably received from a user input device. The data may include such information as speed of movement of the device, pressure applied to the device, rotation of the device, and tilt of the device. The user of the graphics system may set parameters in the system to control conversion of the data into the envelope parameters. Each affine matrix contains one or more envelope parameters. The envelope parameters are applied to a model brush shape for a brush shape selected by the user to create realistic brush effects in the brush stroke graphic. The envelope parameters include such information as scale, offset, and rotation.

The system receives a sketch curve (step 1005), and finds a target section on the existing trajectory curve (step 1010). As above, the target section is a section of the existing trajectory curve between a first target end point and a second target end point. The first target end point is a point on the existing trajectory curve closest to the first end point of the sketch curve. The second target end point is a point on the existing trajectory curve closest to the second end point of the sketch curve. The system removes the target section from the existing trajectory curve (step 1015), and creates a replacement curve (step 1020). Depending on a selection by the artist, the replacement curve may be the sketch curve or may be a smoothed target section, smoothed as described above. The systems inserts the replacement curve into the existing trajectory curve in place of the target section (step 1025). The system fairs the replacement curve and the existing trajectory curve (step 1030), as described above. After the fairing is complete, the existing trajectory curve has been edited to form a edited trajectory curve. Alternately, the edited trajectory curve may be formed using a sketch-based editing technique disclosed in the prior art.

The system edits the envelope curve to correspond to the edited trajectory curve, forming a new envelope. The system forms new affine matrices by linearly interpolating existing affine matrices using arc-lengths from the target section of the existing trajectory curve and from the edited trajectory curve (step 1035). For a new affine matrix at an arc-length position on the edited trajectory curve, the system finds a matrix location on the target section which corresponds to the new affine matrix's arc-length position on the edited trajectory curve. The system finds two target arc-length positions on the target section which are the closest arc-length positions to the matrix location with corresponding existing affine matrices and are on opposite sides of that matrix location. The system then linearly interpolates the existing affine matrices which correspond to those target arc-lengths positions based on the relative distances of those two target positions to the matrix location to generate the new affine matrix. The system may incorporate data from the data received from the user input device as necessary to ensure the new envelope curve conforms to the original intention of the artist when the brush stroke was first entered.

The system calculates the new envelope curve by applying the new affine matrices to the edited trajectory curve (step 1040) in the manner described above for drawing affine brush strokes. One implementation calculates the new envelope as a whole, along the entire edited trajectory curve. An alternate implementation calculates the new envelope for the portion of the envelope corresponding to the sketch curve, smoothing envelope sections as necessary. After calculating the new envelope, the edited brush stroke 1045 is complete.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users. Users can manipulate electronic documents through the graphical user interface, where an electronic document includes any piece of work created with or edited by an application program, and specifically includes a self-contained piece of work that, if saved in a file system, is saved as a separate file.

Other embodiments are within the scope of the following claims.

What is claimed is:

1. A computer-implemented method for generating an envelope enclosing brush instances corresponding to transformations of a brush at points along a trajectory, the method comprising:
    identifying points on the brush instances that are furthest from the trajectory; and
    connecting the identified points based on the trajectory and relative orientations of candidate envelope segments formed by sequentially connecting the identified points.

2. The method of claim 1, wherein the identified points comprise a sequence of ordered points, and wherein connecting the identified points comprises:
    sequentially connecting points in the sequence if two consecutive points in the sequence comprise the same point.

3. The method of claim 1, wherein the identified points comprise a sequence of ordered points, and wherein connecting the identified points comprises:
    sequentially connecting points in the sequence if the line segments do not have similar relative orientations; and otherwise, sequentially connecting points in the sequence and at least one point on the brush instances.

4. The method of claim 1, wherein transformations comprise affine transformations.

5. The method of claim 1, wherein the brush comprises a sequence of connected line segments forming a convex polygon.

6. The method of claim 1, further comprising:
    identifying breakpoints in the sequence as points on candidate envelope segments which do not have similar relative orientations; and
    prior to the connecting step, eliminating breakpoints that are within less than a threshold distance of a candidate envelope segment.

7. The method of claim 1, further comprising:
    determining slopes of line segments formed by connecting the identified points.

8. A computer-implemented method for generating an envelope of a brush at points along a trajectory, the method comprising:
    applying a transformation having at least two parameters which vary independently of each other to the brush at the points along the trajectory to develop brush instances;
    identifying points on the brush instances that are furthest from the trajectory; and
    connecting the identified points based on the trajectory and relative orientations of candidate envelope segments formed by sequentially connecting the identified points.

9. The method of claim 8, wherein a parameter of the transformation comprises a horizontal scale.

10. The method of claim 8, wherein a parameter of the transformation comprises a vertical scale.

11. The method of claim 8, wherein a parameter of the transformation comprises a horizontal offset.

12. The method of claim 8, wherein a parameter of the transformation comprises a vertical offset.

13. The method of claim 8, wherein a parameter of the transformation comprises a horizontal rotation.

14. The method of claim 8, wherein a parameter of the transformation comprises a vertical rotation.

15. The method of claim 8, wherein candidate envelope segments comprise line segments.

16. The method of claim 8, wherein identifying points comprises:
    identifying left-hand points that are furthest to the left of the trajectory and identifying right-hand points that are furthest to the right of the trajectory; and connecting the identified points comprises:
    connecting the left-hand points and connecting the right-hand points.

17. The method of claim 8, wherein the trajectory comprises a contiguous sequence of line segments and identifying points on the brush instances that are furthest from the trajectory comprises:
    identifying, for line segments in the trajectory, brush instances containing the line segments and pairs of points on the identified brush instances that are furthest from the sections of the line segments that are within the identified brush instances.

18. The method of claim 17, further comprising:
    for each pair of points, connecting the pair of points to form a connecting line segment;
    identifying a new pair of points on the identified brush instances that are furthest from the connecting line segment;

if either of the new pairs of points is different from the pair of points, connecting the new pair of points to form a connecting line segment and identifying a second new pair of points.

19. The method of claim 3, wherein sequentially connecting points in the sequence and at least one point on the brush instances comprises:

sequentially connecting points in the sequence and points on the brush instances that are between points in the sequence.

20. The method of claim 3, wherein candidate envelope segments do not have similar relative orientations if an angle between vectors formed by consecutive points in the sequence is not less than about zero degrees.

21. The method of claim 20, wherein the angle between the vectors is measured as the product of the sign of the cross product of the vectors, and the arccosine of the quotient of the dot product of the vectors and the product of the magnitudes of the vectors.

22. A computer program tangibly stored on a computer-readable medium and operable to cause a computer to generate an envelope enclosing brush instances corresponding to transformations of a brush at points along a trajectory, comprising instructions to:

identify points on the brush instances that are furthest from the trajectory; and connect the identified points based on the trajectory and relative orientations of candidate envelope segments formed by sequentially connecting the identified points.

23. The computer program of claim 22, wherein the identified points comprise a sequence of ordered points, and wherein instructions to connect the identified points comprise:

instructions to sequentially connect points in the sequence if two consecutive points in the sequence comprise the same point.

24. The computer program of claim 22, wherein the identified points comprise a sequence of ordered points, and wherein instructions to connect the identified points comprises:

instructions to sequentially connect points in the sequence if the brush instances do not have similar relative orientations; and instructions to sequentially connecting points in the sequence and at least one point on the brush instances if the brush instances have similar relative orientations.

25. The computer program of claim 22, wherein transformations comprise affine transformations.

26. The computer program of claim 22, wherein the brush comprises a sequence of connected line segments forming a convex polygon.

27. The computer program of claim 22, further comprising instructions to:

identify breakpoints in the sequence as points on candidate envelope segments which do not have similar relative orientations; and eliminate breakpoints that are within less than a threshold distance of a candidate envelope segment.

28. The computer program of claim 22, further comprising instructions to:

determine slopes of line segments formed by connecting the identified points.

29. A computer program tangibly stored on a computer-readable medium and operable to cause a computer to generate an envelope of a brush at points along a trajectory, comprising instructions to:

apply a transformation having at least two parameters which vary independently of each other to the brush at the points along the trajectory to develop brush instances;

identify points on the brush instances that are furthest from the trajectory; and connect the identified points based on the trajectory and the relative orientations of the brush instances.

30. The computer program of claim 29, wherein candidate envelope segments comprise line segments.

31. The computer program of claim 29, wherein instructions to identify points comprises instructions to:

identify left-hand points that are furthest to the left of the trajectory and to identify right-hand points that are furthest to the right of the trajectory; and instructions to:

connect the left-hand points and connect the right-hand points.

32. The computer program of claim 29, wherein the trajectory comprises a contiguous sequence of line segments and instructions to identify points on the brush instances that are furthest from the trajectory comprise instructions to:

identify, for line segments in the trajectory, brush instances containing the line segments and pairs of points on the identified brush instances that are furthest from the endpoints of the line segments.

33. The computer program of claim 32, wherein instructions to sequentially connect points in the sequence and at least one point on the brush instances comprise instructions to:

sequentially connect points in the sequence and points on the brush instances that are between points in the sequence.

34. The computer program of claim 32, wherein candidate envelope segments do not have similar relative orientations if an angle between vectors formed by consecutive points in the sequence is not less than zero degrees.

35. The computer program of claim 34, wherein the angle between the vectors is measured as the product of the sign of the cross product of the vectors, and the arccosine of the quotient of the dot product of the vectors and the product of the magnitudes of the vectors.

36. A system, comprising:

a computer having a computer-readable memory;

an input device for developing input signals to the computer representing a trajectory traced by a user;

a computer program residing in the computer-readable memory for generating an envelope enclosing brush instances corresponding to transformations of a brush at points along the trajectory, comprising instructions to identify points on the brush instances that are furthest from the trajectory, and to connect the identified points based on the trajectory and the relative orientations of the brush instances; and an output device for displaying a representation of the envelope.

* * * * *